United States Patent
Chen

(10) Patent No.: US 12,526,520 B2
(45) Date of Patent: Jan. 13, 2026

(54) OPTICAL IMAGE STABILIZATION METHOD AND SYSTEM, AND ELECTRONIC DEVICE

(71) Applicant: GUANGDONG OPPO MOBILE TELECOMMUNICATIONS CORP., LTD., Dongguan (CN)

(72) Inventor: Wei Chen, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 142 days.

(21) Appl. No.: 18/408,078

(22) Filed: Jan. 9, 2024

(65) Prior Publication Data
US 2024/0147069 A1 May 2, 2024

Related U.S. Application Data

(63) Continuation of application No. PCT/CN2022/104981, filed on Jul. 11, 2022.

(30) Foreign Application Priority Data

Aug. 3, 2021 (CN) .......................... 202110887722.3

(51) Int. Cl.
H04N 23/68 (2023.01)
(52) U.S. Cl.
CPC ....... *H04N 23/6812* (2023.01); *H04N 23/683* (2023.01); *H04N 23/687* (2023.01)
(58) Field of Classification Search
CPC . H04N 23/6812; H04N 23/683; H04N 23/687
See application file for complete search history.

(56) References Cited

U.S. PATENT DOCUMENTS

2012/0141101 A1* 6/2012 Cheng ................. H04N 23/687
  348/208.99
2019/0320118 A1 10/2019 Ma et al.

FOREIGN PATENT DOCUMENTS

| CN | 102854700 A | 1/2013 |
| CN | 206181216 U | 5/2017 |
| CN | 209402560 U | 9/2019 |
| CN | 111294484 A | 6/2020 |

(Continued)

OTHER PUBLICATIONS

CNIPA, First Office Action for CN Application No. 202110887722. 3, Oct. 20, 2022.

(Continued)

*Primary Examiner* — Minh Q Phan
(74) *Attorney, Agent, or Firm* — Sheppard, Mullin, Richter & Hampton LLP

(57) ABSTRACT

An optical image stabilization method and system, and an electronic device are provided. The method is implemented by a camera module. The camera module includes a lens and a photosensitive element. Shake data of the camera module is obtained. In response to the shake data being less than or equal to a first threshold, based on the shake data and a first compensation strategy, at least one of the lens and the photosensitive element is driven to move. In response to the shake data being greater than the first threshold, based on the shake data and a second compensation strategy, the lens and the photosensitive element are driven to move.

17 Claims, 8 Drawing Sheets

(56) References Cited

FOREIGN PATENT DOCUMENTS

| | | | | |
|---|---|---|---|---|
| CN | 111355872 | A | 6/2020 | |
| CN | 210694084 | U | 6/2020 | |
| CN | 111432104 | A | 7/2020 | |
| CN | 111432118 | A | 7/2020 | |
| CN | 211266959 | U * | 8/2020 | |
| CN | 112312000 | A | 2/2021 | |
| CN | 112653809 | A | 4/2021 | |
| CN | 112672028 | A | 4/2021 | |
| CN | 113489889 | A | 10/2021 | |
| EP | 3706407 | A1 * | 9/2020 | ........... H04N 23/661 |
| JP | 2004266648 | A | 9/2004 | |
| JP | 2014098787 | A | 5/2014 | |

OTHER PUBLICATIONS

CNIPA, Office Action issued for CN Application No. 202110887722.3, Dec. 21, 2022.
WIPO, International Search Report for PCT Application No. PCT/CN2022/104981, Oct. 11, 2022.

* cited by examiner

OPTICAL IMAGE STABILIZATION METHOD AND SYSTEM, AND ELECTRONIC DEVICE

CROSS-REFERENCING OF RELEVANT APPLICATIONS

This application is a continuation of International Application PCT/CN2022/104981, filed Jul. 11, 2022, which claims priority to Chinese patent application No. 202110887722.3, filed on Aug. 3, 2021, both of which are herein incorporated by reference in their entireties.

TECHNICAL FIELD

The disclosure relates to the technical field of electronic devices, and particularly to an optical image stabilization method, an optical image stabilization (anti-shake) system, and an electronic device.

BACKGROUND

With the continuous popularization of electronic devices, the electronic devices have become indispensable social tools and entertainment tools in people's daily life, and people's requirements for the electronic devices are getting higher and higher. When people photograph with a camera, there are problems of blurring and unclearness in a captured image that are caused by shaking of the camera. At present, the camera may reduce the impact of camera shake on the image clarity by integrating technologies such as optical image stabilization, electronic image stabilization, and photosensitive element image stabilization.

SUMMARY

The embodiments of the disclosure provide an optical image stabilization method. The method is implemented by a camera module, and the camera module includes a lens and a photosensitive element. The method includes: acquiring shake data of the camera module; in response to the shake data being less than or equal to a first threshold, driving, based on the shake data and a first compensation strategy, at least one of the lens and the photosensitive element to move; and in response to the shake data being greater than the first threshold, driving, based on the shake data and a second compensation strategy, the lens and the photosensitive element to move.

The embodiments of the disclosure provide an optical image stabilization system. The optical image stabilization includes a detection module and a camera module. The camera module includes a lens, a photosensitive element, a first driving chip and a second driving chip. The first driving chip is connected with the lens, and the second driving chip is connected with the photosensitive element.

The detection module is configured to acquire shake data of the camera module. When the shake data is less than or equal to a first threshold, based on the shake data and a first compensation strategy, at least one of the lens and the photosensitive element is driven to move; and when the shake data is greater than the first threshold, based on the shake data and a second compensation strategy, each of the lens and the photosensitive element is driven to move. Moving of the lens is driven by the first driving chip, and moving of the photosensitive element is driven by the second driving chip.

The embodiments of the disclosure provide an electronic device. The electronic device includes a lens, a photosensitive element, a first bracket, a first driving motor, and a second driving motor. The first bracket has a first side and a second side arranged opposite to the first side. The first driving motor is arranged on the first side, and the second driving motor is arranged on the second side. The lens is arranged on the first driving motor, and the first driving motor is configured to drive the lens to move. The photosensitive element is arranged on the second driving motor, and the second driving motor is configured to drive the photosensitive element to move.

BRIEF DESCRIPTION OF THE DRAWINGS

In order to more clearly illustrate technical solutions in the embodiments of the disclosure, drawings to be used in the embodiments are briefly described below. Apparently, the following drawings are merely some embodiments of the disclosure, and those skilled in the art can obtain other drawings according to these figures without paying any creative effort.

DETAILED DESCRIPTION OF PREFERRED EMBODIMENTS

Figure 1:
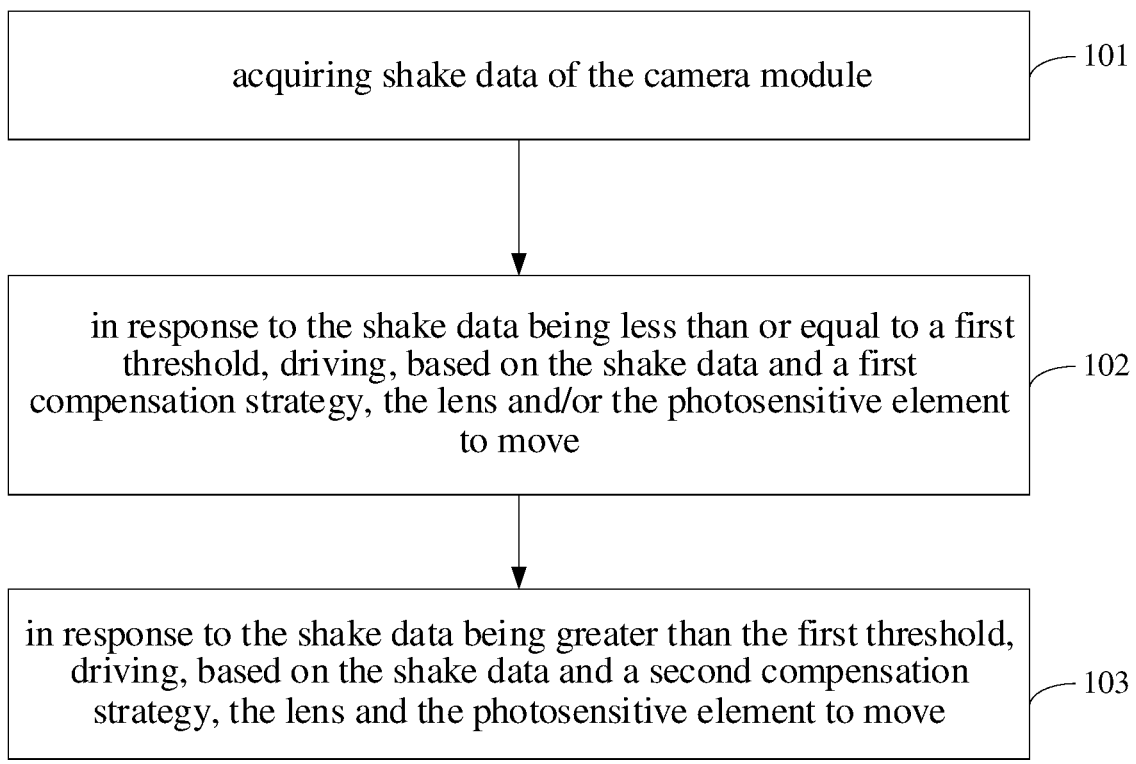
FIG. 1 is a first schematic flowchart of an optical image stabilization method according to some embodiments of the disclosure.

The technical schemes in the embodiments of the disclosure will be described clearly and comprehensively with reference to the drawings in the embodiments of the disclosure. Apparently, the described embodiments are only a part of the embodiments of the disclosure, not all of the embodiments. All other embodiments obtained by those skilled in the art based on the embodiments of the disclosure without creative efforts shall fall within the protection scope of the disclosure.

The embodiments of the disclosure provide an optical image stabilization method. The method is implemented by a camera module, and the camera module includes a lens and a photosensitive element. The method includes: acquiring shake data of the camera module; in response to the shake data being less than or equal to a first threshold, driving, based on the shake data and a first compensation strategy, the lens and/or the photosensitive element to move; and in response to the shake data being greater than the first threshold, driving, based on the shake data and a second compensation strategy, the lens and the photosensitive element to move.

In some alternative embodiments of the disclosure, driving, based on the shake data and the first compensation strategy, the lens and/or the photosensitive element to move includes: determining a first compensation data based on the shake data; in response to the first compensation data meeting a first compensation condition, driving, based on the first compensation data, the lens to move, where the first compensation condition is a condition that the first compensation data only includes a translation amount for the lens; and in response to the first compensation data meeting a second compensation condition, driving, based on the first compensation data, the lens and the photosensitive element to move, where the second compensation condition is a condition that the first compensation data includes a translation amount for the lens and a rotation amount for the photosensitive element.

In some alternative embodiments of the disclosure, driving, based on the first compensation data, the lens to move, includes: driving, based on the first compensation data, the lens to translate; and driving, based on the first compensation data, the lens and the photosensitive element to move, includes: driving, based on the first compensation data, the lens to translate and the photosensitive element to rotate.

In some alternative embodiments of the disclosure, driving, based on the first compensation data, the lens to translate, includes: determining a first translation amount based on the first compensation data; and driving, based on the first translation amount, the lens to translate; and driving, based on the first compensation data, the lens to translate and the photosensitive element to rotate, includes: determining, based on the first compensation data, a second translation amount and a first rotation amount; driving, based on the second translation data, the lens to translate; and driving, based on the first rotation amount, the photosensitive element to rotate.

In some alternative embodiments of the disclosure, the second compensation strategy includes a first sub-strategy and a second sub-strategy, and driving, based on the shake data and the second compensation strategy, the lens and the photosensitive element to move in response to the shake data being greater than the first threshold, includes: in response to the shake data being greater than the first threshold and being less than or equal to a second threshold, driving, based on the shake data and the first sub-strategy, the lens and the photosensitive element to move; and in response to the shake data being greater than the second threshold, driving, based on the shake data and the second sub-strategy, the lens and the photosensitive element to move.

In some alternative embodiments of the disclosure, driving, based on the first sub-strategy, the lens and the photosensitive element to move, includes: determining second compensation data based on the shake data; in response to the second compensation data meeting a third compensation condition, driving, based on the second compensation data, the lens to translate and the photosensitive element to translate, where the third compensation condition is a condition that the second compensation data includes a translation amount for the lens and a translation amount for the photosensitive element; and in response to the second compensation data meeting a fourth compensation condition, driving, based on the second compensation data, the lens to translate and the photosensitive element to translate and rotate, where the fourth compensation condition is a condition that the second compensation data includes a translation amount for the lens, a translation amount for the photosensitive element, and a rotation amount for the photosensitive element.

In some alternative embodiments of the disclosure, driving, based on the second compensation data, the lens to translate and the photosensitive element to translate, includes: determining, based on the second compensation data, a third translation amount and a fourth translation amount; and driving, based on the third translation amount, the lens to translate, and driving, based on the fourth translation amount, the photosensitive element to translate; and driving, based on the second compensation data, the lens to translate and the photosensitive element to translate and rotate, includes: determining, based on the second compensation data, a fifth translation amount, a sixth translation amount, and a second rotation amount; and driving, based on the fifth translation amount, the lens to translate, driving, based on the sixth translation amount, the photosensitive element to translate, and driving, based on the second rotation amount, the photosensitive element to rotate.

In some alternative embodiments of the disclosure, driving, based on the shake data and the second sub-strategy, the lens and the photosensitive element to move, includes: determining third compensation data based on the shake data; and driving, based on the third compensation data, the lens to translate and the photosensitive element to translate.

In some alternative embodiments of the disclosure, driving, based on the third compensation data, the lens to translate and the photosensitive element to translate, includes: determining, based on the third compensation data, a seventh translation amount and an eighth translation amount; and driving, based on the seventh translation amount, the lens to translate, and driving, based on the eighth translation amount, the photosensitive element to translate.

The embodiments of the disclosure provide an optical image stabilization system. The optical image stabilization system includes a detection module and a camera module, the camera module includes a lens, a photosensitive element, a first driving chip and a second driving chip. The first driving chip is connected with the lens, and the second driving chip is connected with the photosensitive element.

The detection module is configured to acquire shake data of the camera module, and transmit the shake data to the first driving chip and/or the second driving chip. When the shake data is less than or equal to a first threshold, based on the shake data and a first compensation strategy, the first driving chip is configured to drive the lens to move and/or the second driving chip is configured to drive the photosensitive element to move. When the shake data is greater than the first threshold, based on the shake data and a second compensation strategy, the first driving chip is configured to drive the lens to move and the second driving chip is configured to drive the photosensitive element to move.

In some alternative embodiments of the disclosure, the camera module further includes a first driving motor and a second driving motor. The first driving chip is connected with the lens through the first driving motor, the first driving chip is configured to control the lens by driving the first driving motor. The second driving chip is connected with the photosensitive element through the second driving motor, and the second driving chip is configured to control the photosensitive element by controlling the second driving motor.

In some alternative embodiments of the disclosure, the detection module is connected with the first driving chip, and the detection module is configured to transmit the acquired shake data to the first driving chip. The first driving chip is configured to analyze the shake data, and obtain, through the analysis, a translation amount for the lens and/or a translation amount for the photosensitive element and/or a rotation amount for the photosensitive element. The first driving chip is further configured to control, based on the obtained translation amount for the lens, the first driving motor to drive the lens to move. The first driving chip is further configured to transmit the analyzed translation amount for the photosensitive element and/or the analyzed rotation amount for the photosensitive element to the second driving chip, and the second driving chip is configured to control, based on the translation amount for the photosensitive element and/or the rotation amount for the photosensitive element, the second driving motor to drive the photosensitive element to move.

In some alternative embodiments of the disclosure, the detection module is connected with the second driving chip, and the detection module is configured to transmit the acquired shake data to the second driving chip. The second driving chip is configured to analyze the shake data, and obtain, through the analysis, a translation amount for the lens and/or a translation amount for the photosensitive element and/or a rotation amount for the photosensitive element. The second driving chip is further configured to control, based on the obtained translation amount for the photosensitive element and/or the rotation amount for the photosensitive element, the second driving motor to drive the photosensitive element to move. The second driving chip is further configured to transmit the analyzed translation amount for the lens to the first driving chip, and the first driving chip is configured to control, based on the translation amount for the lens, the first driving motor to drive the lens to move.

In some alternative embodiments of the disclosure, the optical image stabilization system further includes a processor, the processor is configured to transmit a control signal to the first driving chip and the second driving chip, and each of the first driving chip and the second driving chip is further configured to process the shake data based on the control signal.

In some alternative embodiments of the disclosure, the detection module is connected with the processor, and the processor is connected with each of the first driving chip and the second driving chip. The processor is configured to processes the shake data detected by the detection module, and obtain, through the processing, compensation data for the lens and compensation data for the photosensitive element. The processor is further configured to transmit the compensation data for the lens to the first driving chip, and the first driving chip is configured to control, based on the compensation data for the lens, the lens to move. The processor is further configured to transmit the compensation data for the photosensitive element to the second driving chip, and the second driving chip is configured to control, based on the compensation data for the photosensitive element, the photosensitive element to move.

The embodiments of the disclosure further provide a non-transitory computer-readable storage medium storing a computer program thereon. The computer program, when being executed by a computer, causes the computer to implement the above optical image stabilization method.

The embodiments of the disclosure further provide an electronic device. The electronic device includes a processor and a memory, the memory stores a computer program thereon, and the processor calls the computer program to implement the above optical image stabilization method.

The embodiments of the disclosure further provide an electronic device. The electronic device includes a lens, a photosensitive element, a first bracket, a first driving motor, and a second driving motor. The first bracket has a first side and a second side arranged opposite to the first side, the first driving motor is arranged on the first side, and the second driving motor is arranged on the second side. The lens is arranged on the first driving motor, and the first driving motor is configured to drive the lens to move. The photosensitive element is arranged on the second driving motor, and the second driving motor is configured to drive the photosensitive element to move.

In some alternative embodiments of the disclosure, the first driving motor is configured to drive the lens to translate in a preset plane, and the second driving motor is configured to drive the photosensitive element to translate in the preset plane or to rotate around a preset axis.

In some alternative embodiments of the disclosure, each of the first driving motor and the second driving motor includes any one of an electromagnetic motor, a piezoelectric motor, a memory alloy driver.

The embodiments of the disclosure provide an optical image stabilization method. Referring to FIG. 1, FIG. 1 is a first schematic flowchart of the optical image stabilization method according to some embodiments of the disclosure. The optical image stabilization method is implemented by a camera module, and the camera module includes a lens and a photosensitive element. The optical image stabilization method includes operations as follows.

At 101, shake data of the camera module is acquired.

During a process in which the camera module captures an image, the image clarity would be affected when there is a shake or movement of the camera module, causing the captured image to be blurred. The shake data of the camera module may be acquired through an angular motion detection module that detects an angular velocity. For example, the angular motion detection module is a gyroscope, which may detect whether the camera module shakes or not, and obtain angular velocity information of the camera module when the camera module shakes. In some other embodiments, the shake data of the camera module may also be acquired through a detection module that detects acceleration, such as an accelerometer. Of course, the shake data of the camera module may also be acquired through other detection modules, as long as the shake data of the camera module can be detected, which is not limited in the embodiments of the disclosure. The shake data of the camera module may be detected based on the angular velocity and/or acceleration information of the detection module. For example, the shake data of the camera module may be 1 degree, 2 degrees, or 3 degrees indicating the degree of shake of the camera module.

At 102, in response to the shake data being less than or equal to a first threshold, the lens and/or the photosensitive element is driven to move, based on the shake data and a first compensation strategy.

Because the movement of the lens and the movement of the photosensitive element need to cooperate with each other, the optical image stabilization may be realized by setting, based on the shake data, the movement of the lens and the movement of the photosensitive element appropriately. In this way, the optical image stabilization at a large angle is realized, and the optical image stabilization effect of the camera module is improved effectively. It is illustrated by taking a case where the lens can compensate for a shake of maximum 2 degrees as an example. The first threshold may be set as 2 degrees. In response to the shake data of the camera module being less than or equal to 2 degrees, the lens and/or photosensitive element is driven to move based on the shake data and the first compensation strategy. The first compensation strategy may include: driving the lens to move to compensate for the shake of the camera module, driving the photosensitive element to move to compensate for the shake of the camera module, and driving both of the lens and the photosensitive element to move to compensate for the shake of the camera module.

At 103, in response to the shake data being greater than the first threshold, the lens and the photosensitive element are driven to move, based on the shake data and a second compensation strategy.

In response to the shake data being greater than 2 degrees, the lens and the photosensitive element are driven to move based on the shake data and the second compensation strategy. In the second compensation strategy, both the movements of the lens and the photosensitive element may be driven to compensate for the shake of the camera module. The optical image stabilization for a shake of a large angle may be realized by driving both the lens and the photosensitive element to move.

The embodiments of the disclosure provide the optical image stabilization method in which image stabilization on the lens and image stabilization on the photosensitive element can be enabled at the same time. Different image stabilization strategies are adopted based on the shake data of the camera module. Compared with using only one image stabilization mechanism, such as the image stabilization mechanism for only the camera or the photosensitive element, the embodiments of the disclosure can realize the optical image stabilization under a shake of a large angle, and effectively improve the optical image stabilization effect of the camera module.

In some embodiments, the second compensation strategy may include a first sub-strategy and a second sub-strategy, and the first sub-strategy is different from the second sub-strategy. In response to the shake data being greater than the first threshold and being less than or equal to a second threshold, the lens and the photosensitive element are driven to move based on the shake data and the first sub-strategy. In response to the shake data being greater than the second threshold, the lens and the photosensitive element are driven to move based on the shake data and the second sub-strategy. Although both of the first sub-strategy and the second sub-strategy are used to drive the lens and the photosensitive element to move, different movement modes are adopted in the two sub-strategies. Specifically, the first sub-strategy may include: driving, based on the shake data, both the lens and the photosensitive element to translate; or driving, based on the shake data, the lens to translate and the photosensitive element to translate and rotate. The second sub-strategy may include driving, based on the shake data, both the lens and the photosensitive element to translate.

Figure 2:
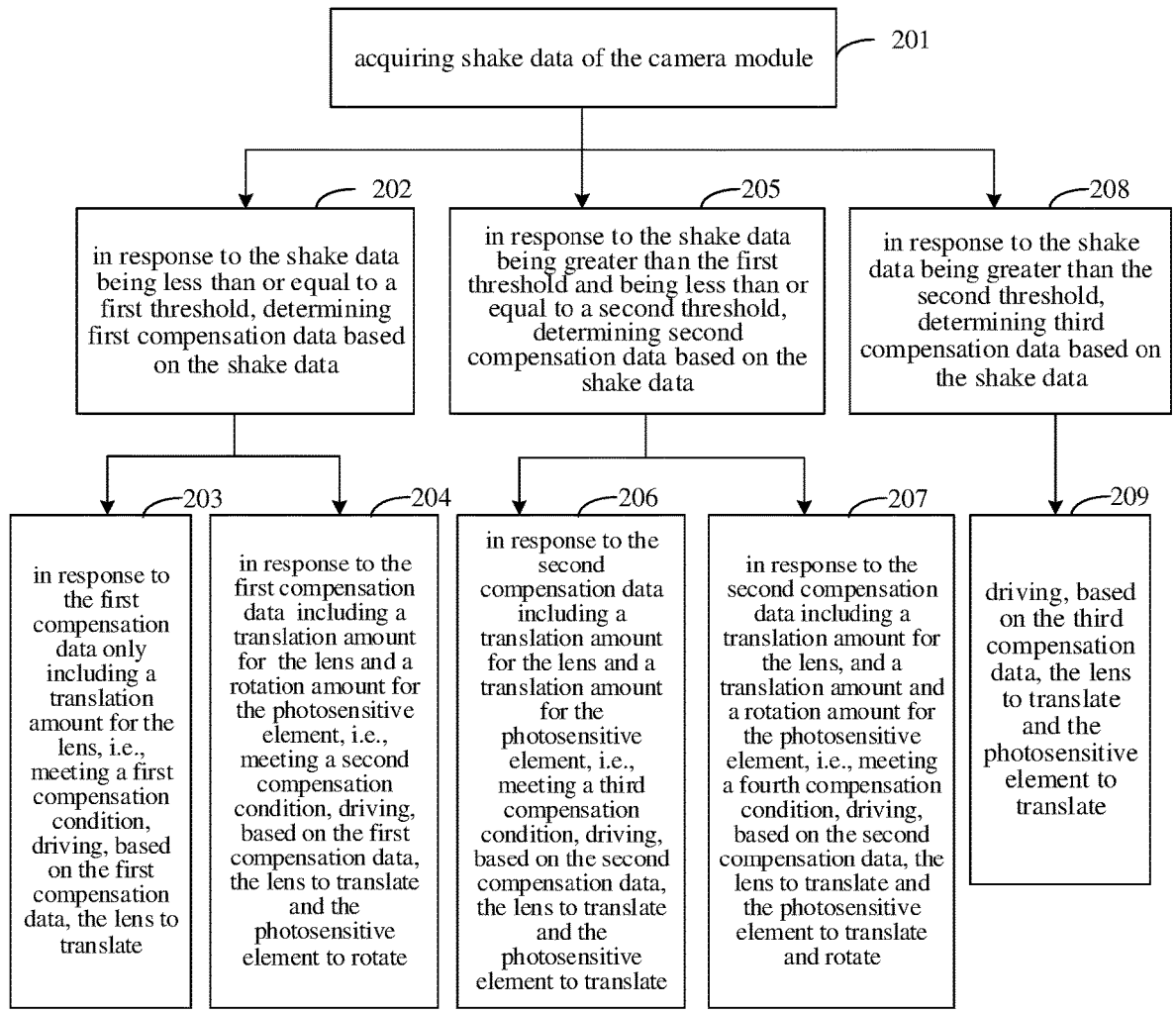
FIG. 2 is a second schematic flowchart of the optical image stabilization method according to some embodiments of the disclosure.

Exemplarily, the first sub-strategy may include: determining second compensation data based on the shake data; in response to the second compensation data meeting a third compensation condition, driving, based on the second compensation data, the lens to translate and the photosensitive element to translate, where the third compensation condition is a condition that the second compensation data includes a translation amount for the lens and a translation amount for the photosensitive element; and in response to the second compensation data meeting a fourth compensation condition, driving, based on the second compensation data, the lens to translate and the photosensitive element to translate and rotate, where the fourth compensation condition is a condition that the second compensation data includes a translation amount for the lens, a translation amount for the photosensitive element, and a rotation amount for the photosensitive element. The second sub-strategy may include: determining third compensation data based on the shake data; driving, based on the third compensation data, the lens to translate and the photosensitive element to translate. Referring to FIG. 2, FIG. 2 is a second schematic flowchart of the optical image stabilization method according to some embodiments of the disclosure.

At 201, shake data of the camera module is acquired.

During a process in which the camera module captures an image, the image clarity would be affected when there is a shake or movement of the camera module, causing the captured image to be blurred. The shake data of the camera module may be obtained through an angular motion detection module that detects an angular velocity. For example, the angular motion detection module is a gyroscope, which may detect whether the camera module shakes or not, and obtain angular velocity information of the camera module when the camera module shakes. In some other embodiments, the shake data of the camera module may also be acquired through a detection module that detects acceleration, such as an accelerometer. Of course, the shake data of the camera module may also be obtained through other detection modules, as long as the shake data of the camera module can be detected, which is not limited in the embodiments of the disclosure. An angle of the shake of the camera module may be detected based on the angular velocity and/or acceleration information of the detection module. For example, the angle may be 1 degree, 2 degrees, or 3 degrees.

At 202, in response to the shake data being less than or equal to a first threshold, first compensation data is determined based on the shake data.

At 203, in response to the first compensation data meeting a first compensation condition, the lens is driven to translate based on the first compensation data, where the first compensation condition is a condition that the first compensation data only includes a translation amount for the lens.

At 204, in response to the first compensation data meeting a second compensation condition, the lens and the photosensitive element are driven to move based on the first compensation data, where the second compensation condition is a condition that the first compensation data includes a translation amount for the lens and a rotation amount for the photosensitive element.

With regard to operations 202 to 204:

Because the movement of the lens and the movement of the photosensitive element need to cooperate with each other, the optical image stabilization may be realized by setting, based on the shake data, the movement of the lens and the movement of the photosensitive element appropriately, so as to realize the optical image stabilization under a shake of a large angle, and effectively improve the optical image stabilization effect of the camera module. It is illustrated by taking, as an example, a case where the lens can compensate a translational shake of maximum 2 degrees, and the photosensitive element can compensate a translational shake of maximum 2 degrees and compensate a rotational shake of maximum 3 degrees. The first threshold may be set as 2 degrees. In response to the shake data of the camera module being less than or equal to 2 degrees, the first compensation data is determined based on the shake data. In response to the first compensation data meeting the first compensation condition, the lens is driven to translate based on the first compensation data. In response to the first compensation data meeting the second compensation condition, the lens is driven to translate and the photosensitive element is driven to rotate, based on the first compensation data.

The first compensation data may be determined based on the shake data, a current position of the lens and/or a current position of the photosensitive element. For example, an initial central position of the lens is taken as an origin to establish an X-Y coordinate system on a plane where the lens is located; and an initial central position of the photosensitive element is taken as an origin to establish an X-Y space rectangular coordinate system on a plane where the photosensitive element is located. The current position of the lens and the current position of the photosensitive element may be determined based on the shake data. Based on the current positions and the initial positions of the lens and the photosensitive element, it may be determined whether there is a translation offset and/or rotation offset of the camera module. In response to the translation offset of the camera module, the translation offset of the camera module may be compensated by translating the lens. In response to the rotation offset of the camera module, the rotation offset of the camera module may be compensated by rotating the photosensitive element. For example, the first compensation data is calculated based on a shake angle (i.e., an angle of the shake) as well as the current positions of the lens and the photosensitive element. If the first compensation data only includes the translation amount for the lens, it means that the first compensation data meets the first compensation condition. If the first compensation data includes the rotation amount for the photosensitive element, it means that the first compensation data meets the second compensation condition.

In an example, the shake angle of the camera module is 0.5 degrees, the current position of the lens is (Xa, Ya), and the shake data of the camera module is contributed only by a translation offset. The first compensation data is calculated based on the current position, and a first translation amount (−Xb, −Yb) is determined based on the first compensation data. The lens is driven to translate Xb units of length along a negative direction of the X-axis, and to translate Yb units of length along a negative direction of the Y-axis, so as to locate the lens at a target position (Xa-Xb, Ya-Yb). As such, the image stabilization of the camera module can be realized.

In an example, the shake angle of the camera module is 1.5 degrees, the current position of the lens is (Xc, Yc), and the current position of the photosensitive element is (X1, Y1). The shake data of the camera module is contributed by a translation offset and a rotation offset. For example, 1 degree out of the 1.5 degrees is contributed by the translation offset of the camera module, and the remaining 0.5 degrees is contributed by the rotation offset of the camera module. The first compensation data is calculated based on the shake data of 1.5 degrees, and the calculated first compensation data includes a second translation amount (−Xd, −Yd) for the lens, and a first rotation amount (−X2, −Y2), (X3, 0) for the photosensitive element. Based on the second translation amount, the lens is driven to translate Xd units of length along the negative direction of the X-axis, and to translate Yd units of length along the negative direction of the Y-axis, so as to locate the lens at a target position (Xc-Xd, Yc-Xd). Based on the first rotation amount, a first part of the photosensitive element is driven to move X2 units of lengths along the negative direction of the X-axis, and a second part of the photosensitive element is driven to move X3 units of lengths along a positive direction of the X-axis, and a third part of the photosensitive element is driven to move Y2 units of lengths along the negative direction of the Y-axis, so as to locate the photosensitive element at a target position (X4, Y4). The target position (X4, Y4) is a position to which the photosensitive element is finally rotated and that is reached by translating the positions of the different parts of the photosensitive element. That is, −X2, −Y2 and X3 of the first rotation amount may be used to indicate an amount of translation for each part of the photosensitive element relative to its initial position, and 0 of the first rotation amount may be used to indicate a point where the second driving motor is provided or a point around which the rotation is performed. It is notable that, since the movement of the photosensitive element may include the translation and the rotation, all of which require to be driven by a driving assembly. The rotation is realized by driving the different parts of the photosensitive element to translate. For example, the photosensitive element may be driven to rotate around a predetermined axis, by driving the different parts of the photosensitive element to translate in opposite directions along the same coordinate axis, or by driving different parts of the photosensitive element that are located on the same coordinate axis to translate at different driving speeds. Since the translation and the rotation share the same travel, the rotation cannot be further implemented when the translation reaches the maximum travel, and the translation cannot be further implemented when the rotation reaches the maximum travel. Based on this, in the embodiments of the disclosure, the movements of the lens and the photosensitive element are required to be set appropriately based on the shake data, so as to achieve the image stabilization for a shake of a large angle.

At 205, in response to the shake data being greater than the first threshold and being less than or equal to a second threshold, second compensation data is determined based on the shake data.

At 206, in response to the second compensation data meeting a third compensation condition, the lens and the photosensitive element are driven to translate based on the second compensation data, where the third compensation condition is a condition that the second compensation data includes a translation amount for the lens and a translation amount for the photosensitive element.

At 207, in response to the second compensation data meeting a fourth compensation condition, based on the second compensation data, the lens is driven to translate and the photosensitive element is driven to translate and rotate, where the fourth compensation condition is a condition that the second compensation data includes a translation amount for the lens, a translation amount for the photosensitive element, and a rotation amount for the photosensitive element.

With regard to operations 205 to 207:

The first threshold may be 2 degrees, and the second threshold may be 3 degrees. When the shake data is greater than the first threshold and less than or equal to the second threshold, for example, when the shake data is greater than 2 degrees and less than or equal to 3 degrees, the second compensation data is determined based on the shake data. When the second compensation data meets the third compensation condition, based on the second compensation data, the lens is driven to translate and the photosensitive element is driven to translate. When the second compensation data meets the fourth compensation condition, based on the second compensation data, the lens is driven to translate and the photosensitive element is driven to translate and rotate.

For example, when the shake data is greater than 2 degrees and less than or equal to 3 degrees, the second compensation data is calculated based on the shake angle as well as the current positions of the lens and the photosensitive element. When the second compensation data includes the translation amount for the lens and the translation amount for the photosensitive element, it means that the second compensation data meets the third compensation condition. When the second compensation data includes the translation amount for the lens, the translation amount for the photosensitive element, and the rotation amount for the photosensitive element, the second compensation data meets the fourth compensation condition.

The second compensation data may be determined based on the shake data, the current position of the lens and/or the current position of the photosensitive element. Since the lens may compensate a translational shake of maximum 2 degrees, and assuming that the shake data of the camera module is determined as 2.5 degrees based on the shake data, it requires a translation of the lens and a translation of the photosensitive element for the image stabilization of the camera module. The current position (Xe, Ye) of the lens and the current position (X5, Y5) of the photosensitive element are acquired. The second compensation data is calculated based on the shake data of 2.5 degrees, in which the second compensation data includes a third translation amount (−Xf, −Yf) for the lens, and a fourth translation amount (−X6, −Y6) for the photosensitive element. Based on the calculated third translation amount, the lens is driven to translate Xf units of length along the negative direction of the X-axis and to translate Yf units of length along the negative direction of the Y-axis, so as to locate the lens at the target position (Xe-Xf, Ye-Xf). Based on the fourth translation amount, the photosensitive element is driven to move X6 units of lengths along the negative direction of the X-axis, and to move Y6 units of length along the negative direction of the Y-axis, so as to locate the photosensitive element at the target position (X5-X6, Y5-Y6).

Assuming that the shake data of the camera module is determined as 3 degrees based on the shake data, and 0.5 degrees of such shake data is contributed by the rotation offset of the camera module, it requires a translation of the lens, a translation of the photosensitive element, and a rotation of the photosensitive element for the image stabilization of the camera module. The current position (Xg, Yg) of the lens and the current position (X7, Y7) of the photosensitive element are acquired. The second compensation data is calculated based on the shake data of 3 degrees, in which the second compensation data includes a fifth translation amount (−Xh, −Yh) for the lens, a sixth translation amount (−X8, −Y8) for the photosensitive element, and a second rotation amount (X9, Y9), (X10, 0) for the photosensitive element. Based on the fifth translation amount, the lens is driven to translate Xh units of length along the negative direction of the X-axis, and to translate Yh units of length along the negative direction of the Y-axis, so as to locate the lens at the target position (Xg-Xh, Yg-Yh). Based on the sixth translation amount, the photosensitive element is driven to move X8 units of lengths along the negative direction of the X-axis, Y8 units of length along the negative direction of the Y-axis, so as to locate the photosensitive element at a position (X7-X8, Y7-Y8). For example, the shake of 2.5 degrees of the camera module may be compensated by translating the lens and the camera module, and the remaining shake of 0.5 degrees may be compensated by rotating the photosensitive element. Based on the second rotation amount, the first part of the photosensitive element is driven to translate X9 units of length along the positive direction of the X-axis, the second part of the photosensitive element is driven to translate X10 units of length along the positive direction of the X-axis, and a third part of the photosensitive element is driven to translate Y9 units of length along the positive direction of the Y-axis, thereby compensating for the remaining shake of 0.5 degrees. As such, the photosensitive element is located at a target position (X11, Y11).

It can be understood that, when the shake data is greater than 2 degrees and less than or equal to 3 degrees, the lens only performs translation compensation, and the photosensitive element preferentially performs translation compensation. When there is a rotation offset of the camera module, the compensation would be made through the rotation of the photosensitive element. By appropriately setting the motion compensation of the lens and the motion compensation of the photosensitive element, it is possible to achieve a joint double optical image stabilization for the camera module under a shake of 3 degrees.

At 208, in response to the shake data being greater than the second threshold, third compensation data is determined based on the shake data.

At 209, based on the third compensation data, the lens is driven to translate and the photosensitive element is driven to translate.

With regard to operations 208 to 209:

When the shake data is greater than 3 degrees, the image stabilization of the camera module is performed in such a manner that the lens only performs the translation compensation and the photosensitive element performs the translation compensation to compensate for the shake of the camera module, and the photosensitive element does not perform the rotation compensation for the camera module. Assuming that the shake data is 3.1 degrees, the current position of the lens is (Xi, Yi), and the current position of the photosensitive element is (X12, Y12), the third compensation data is determined based on the shaking data as well as the current positions of the lens and the photosensitive element, in which the third compensation data includes a seventh translation amount (−Xj, −Yj) for the lens, and an eighth translation amount (−X13, −Y13) for the photosensitive element. Based on the calculated seventh translation amount, the lens is driven to translate Xj units of length along the negative direction of the X-axis and to translate Yj units of length along the negative direction of the Y-axis, so as to locate the lens at a target position (Xi-Xj, Yi-Xj). Based on the eighth translation amount, the photosensitive element is driven to move X13 units of lengths along the negative direction of the X-axis, and to move Y13 units of length along the negative direction of the Y-axis, so as to locate the photosensitive element at a target position (X12-X13, Y12-Y13).

It can be understood that, when the shake data is greater than 3 degrees, the lens only performs the translation compensation and the photosensitive element only performs the translation compensation. By appropriately setting the motion compensation of the lens and the photosensitive element, the camera module can be enabled with the optical image stabilization for the shake of being greater than 3 degrees.

The optical image stabilization method, provided by the embodiments of the disclosure, enables image stabilization on the lens and image stabilization on the photosensitive element at the same time. Compared with using only one image stabilization mechanism, such as the image stabilization mechanism for only the camera or the photosensitive element, by arranging, based on the shake data of the camera module, the movements of the lens and photosensitive element appropriately, the movements of the lens and the photosensitive element can be maximally utilized to achieve the optical image stabilization for a shake of a large angle, thereby effectively enhancing the optical image stabilization effect of the camera module.

The embodiments of the disclosure provide an electronic device, which is used herein as an "electronic device" (or referred to as "terminal"), including but not limited to a device configured to receive/transmit a communication signal via a wired line connection and/or via a wireless communication network such as a cellular network or a wireless local area network. Examples of mobile terminals include, but are not limited to, a cellular telephone and a conventional laptop and/or palm-type receiver or other electronic devices including a radio transceiver. A mobile phone is an electronic device configured with a cellular communication module.

Figure 3:
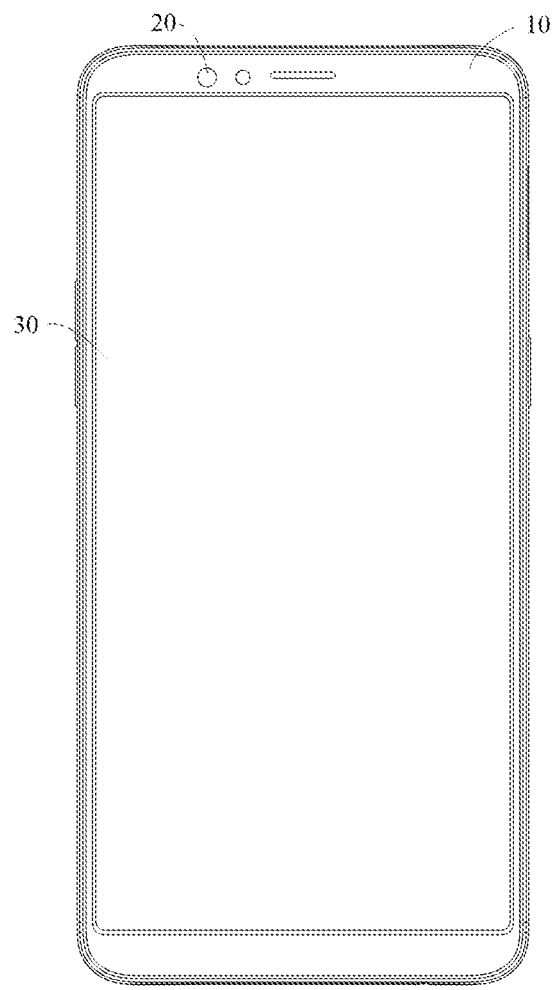
FIG. 3 is a first schematic structural diagram illustrating an electronic device according to some embodiments of the disclosure.

Exemplarily, referring to FIG. 3, FIG. 3 is a schematic structural diagram illustrating an electronic device according to some embodiments of the disclosure. The electronic device 1 may include a housing 10, a camera module 20 and a display screen 30. The display screen 30 is provided on the housing 10 and may be used to display an image. The camera module 20 may be provided in the housing 10 and may receive light emitted from an external environment for capturing an image. The housing 10 may include a middle frame and a rear case, the display screen 30 may cover one side of the middle frame, and the rear case covers the other side of the middle frame. For example, the display screen 30 and the rear case may be provided at two opposite sides of the middle frame by bonding, welding, clamping or other means. The camera module 20 may be provided between the display screen 30 and the rear case, and the camera module 20 can receive the light emitted from the external environment.

The rear case may be a battery cover of the electronic device 1, and the rear case may be made of for example glasses, metals, or rigid plastics. Alternatively, the rear case may also be made of other electrochromic materials. The rear case has a certain structural strength, and the rear case is mainly configured to protect the electronic device 1. Correspondingly, the middle frame may also be made of for example glasses, metals, or rigid plastics. The middle frame also has a certain structural strength, and the middle frame is mainly configured to support and fix the camera module 20 and other functional elements, such as a battery, a motherboard, and an antenna, mounted between the middle frame and the rear case. Further, since the middle frame and the rear case are generally directly exposed to the external environment, the materials of the middle frame and the rear case may preferably have certain properties such as abrasion resistance, corrosion resistance, and scratch resistance. Alternatively, the outer surface of the middle frame and the rear case (that is, an outer surface of the electronic device 1) is coated with a layer of functional material for abrasion resistance, corrosion resistance, and scratch resistance.

The display screen 30 may include a display module and a circuit for responding to a touch operation performed on the display module. The display screen 30 may be an organic light-emitting diode (OLED) screen for image display. Alternatively, the display screen 30 may be a liquid crystal display (LCD) screen for image display. In addition, in terms of appearance, the display screen 30 may be a flat screen, a dual-edge curved screen (hyperbolic screen), or a four-edge curved screen, which is not limited in the embodiments. It is notable that, for the mobile phone, the flat screen refers to a fact that the display 30 is planar as a whole. The dual-edge curved screen means that a left-edge region and a right-edge region of the display screen 30 are curved, and other regions are still planar. This can not only reduce a black edge of the display screen 30, but also increase the visible region of the display screen 30, which then enables the aesthetic feeling of appearance and the holding hand-feeling of the electronic device 1 to be improved. The four-edge curved screen refers to a fact that an upper-edge region, a lower-edge region, a left-edge region and a right-edge region of the display screen 30 are all curved, and other regions are still planar. This can not only reduce the black edge of the display screen 30, but also increase the visible region of the display screen 30, which then enables the aesthetic feeling of appearance and the holding hand-feeling of the electronic device 1 to be further improved.

Figure 4:
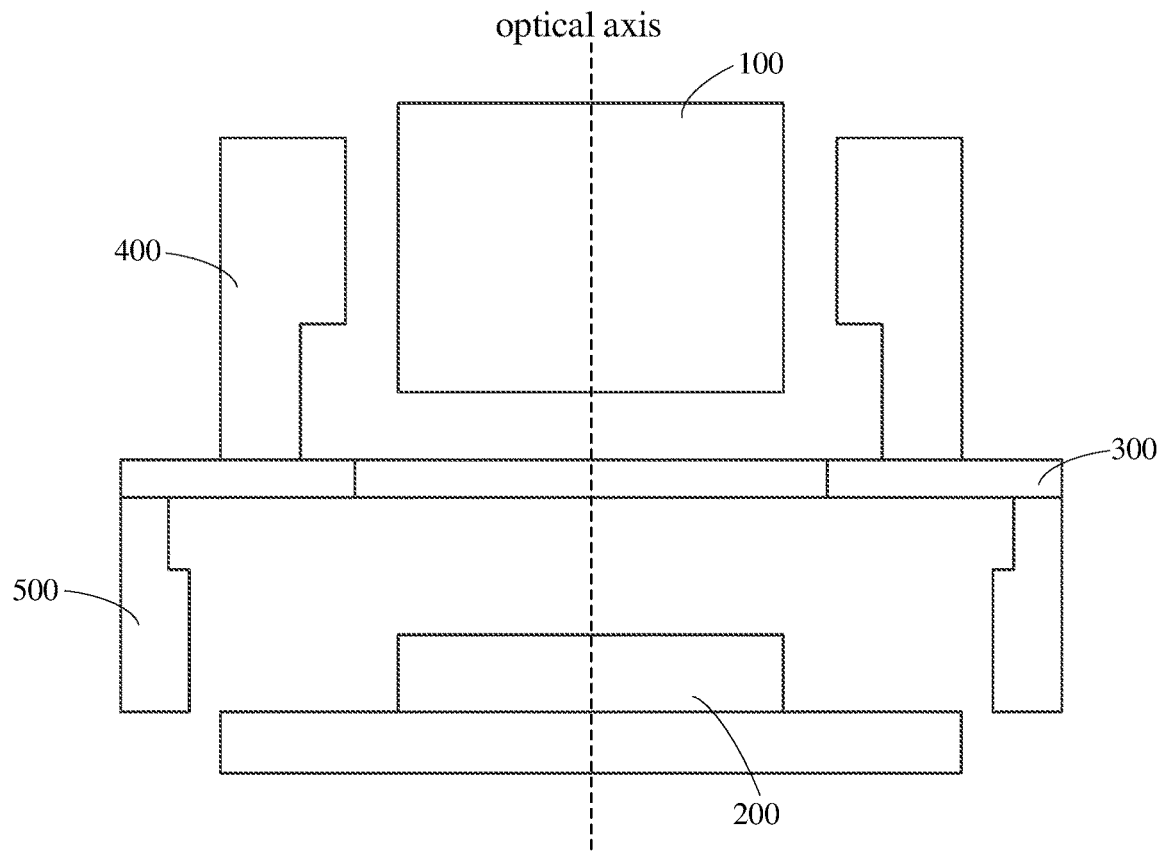
FIG. 4 is a schematic structural diagram illustrating a camera module in the electronic device illustrated in FIG. 3.

Referring to FIG. 4, FIG. 4 is a schematic structural diagram illustrating a camera module in the electronic device illustrated in FIG. 3. The camera module 20 includes a lens 100, a photosensitive element 200, a first bracket 300, a first driving motor 400, and a second driving motor 500. The first bracket 300 has a first side and a second side opposite to the first side, the first driving motor 400 is provided on the first side, the second driving motor 500 is provided on the second side. It can be understood that, the first driving motor 400 and the second driving motor 500 are both provided on the same bracket, and they are located on the opposite sides of the first bracket 300, respectively. In this way, one bracket can be saved compared with the related art in which the first driving motor 400 and the second driving motor 500 are arranged on different brackets respectively, thereby simplifying the structure of the camera module 20.

The lens 100 is provided on the first driving motor 400, and the first driving motor 400 may drive the lens 100 to move, thereby realizing the image stabilization on the lens 100. The lens 100 may be made of glass or plastic, etc. The lens 100 is mainly configured to change a propagation path of light and focus the light. The lens 100 may include multiple groups of lenses, and the multiple groups of lenses may mutually correct and filter the light.

The photosensitive element 200 may specifically be an image sensor of charge coupled device (CCD) type or an image sensor of complementary metal-oxide-semiconductor (CMOS) type. The photosensitive element 200 may be arranged opposite to the lens 100 in a direction of an optical axis of the camera module 20 (i.e., a direction of an optical axis of the lens 100, as shown by a dashed line in FIG. 2). The photosensitive element 200 is mainly configured to receive light collected by the lens 100 and convert an optical signal into an electrical signal, so as to meet an imaging requirement for the camera module 20. The photosensitive element 200 is arranged on the second driving motor 500, and the second driving motor 500 may drive the photosensitive element 200 to move, so as to realize the image stabilization on the photosensitive element 200 of the camera module 20.

It can be understood that, the first driving motor 400 and the second driving motor 500 are mainly configured to improve the imaging effect of the camera module 20 in a case where a shake is brought by the user to the camera module 20 during capturing, so as to enable the imaging effect of the photosensitive element 200 to meet the user's usage requirement. The camera module 20 of the embodiments of the disclosure can not only realize the image stabilization on the lens 100, but also realize the image stabilization on the photosensitive element 200. In other words, the camera module 20 of the embodiments of the disclosure has dual image stabilization functions.

In the embodiments of the disclosure, the first driving motor 400 may be one of an electromagnetic motor, a piezoelectric motor, a memory alloy driver, and a micro-electro-mechanical system. The electromagnetic motor may include an elastic-piece-type motor and a ball-type motor. The first driving motor 400 may drive the lens 100 to translate in a preset plane. The second driving motor 500 may also be one of the electromagnetic motor, the piezoelectric motor, the memory alloy driver and the micro-electro-mechanical system. In addition, the second driving motor 500 may adopt the same type of motor as the first driving motor 400. For example, both of the second driving motor 500 and the first driving motor 400 adopt the electromagnetic motor, or adopt the piezoelectric motor. Certainly, the type of motor adopted by the second driving motor 500 may be different from that adopted by the first driving motor 400. For example, the first driving motor 400 may adopt the electromagnetic motor, and the second driving motor 500 may adopt the memory alloy driver and the micro-electro-mechanical system (MEMS). The second driving motor 500 may drive the photosensitive element 200 to translate on a preset plane or drive the photosensitive element 200 to rotate around a preset axis.

In related technologies, only a single image stabilization function, such as image stabilization on a camera or image stabilization on a photosensitive chip, may be realized. However, the single image stabilization structure, such as an image stabilization structure for the camera or the photosensitive chip, is limited by a structural space of the electronic device, which results in image stabilization at a limited degree, and the optical image stabilization function can only be realized for a small angle (e.g., an angle within 1 degree or within 1.5 degrees). According to the embodiments of the disclosure, the camera module 20 can not only realize the image stabilization on the lens 100, but also realize the image stabilization on the photosensitive element 200. That is, the camera module 20 integrates the image stabilization on the lens 100 and the image stabilization on the photosensitive element 200. Compared with the related technology, the camera module 20 can realize the optical image stabilization for a large angle, so as to effectively improve the optical image stabilization effect of the camera module 20. For example, the camera module 20 of the disclosure can compensate, through the lens, a translational shake of 2 degrees, compensate, through the photosensitive element, a translational shake of 2 degrees, and compensate, through the photosensitive element, a rotational shake of 3 degrees.

Figure 5:
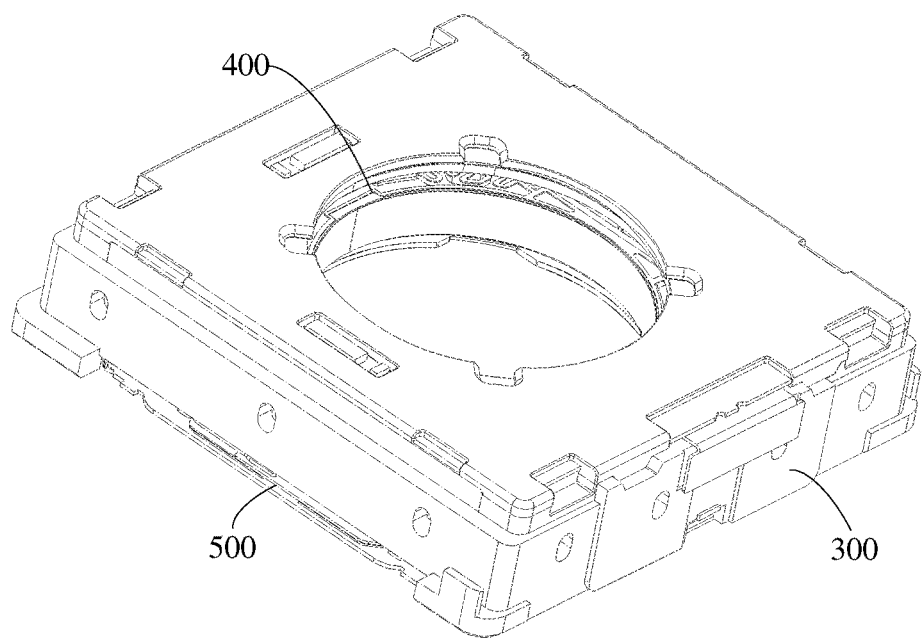
FIG. 5 is a schematic structural diagram illustrating a first bracket, a first driving motor and a second driving motor illustrated in FIG. 4.
Figure 6:
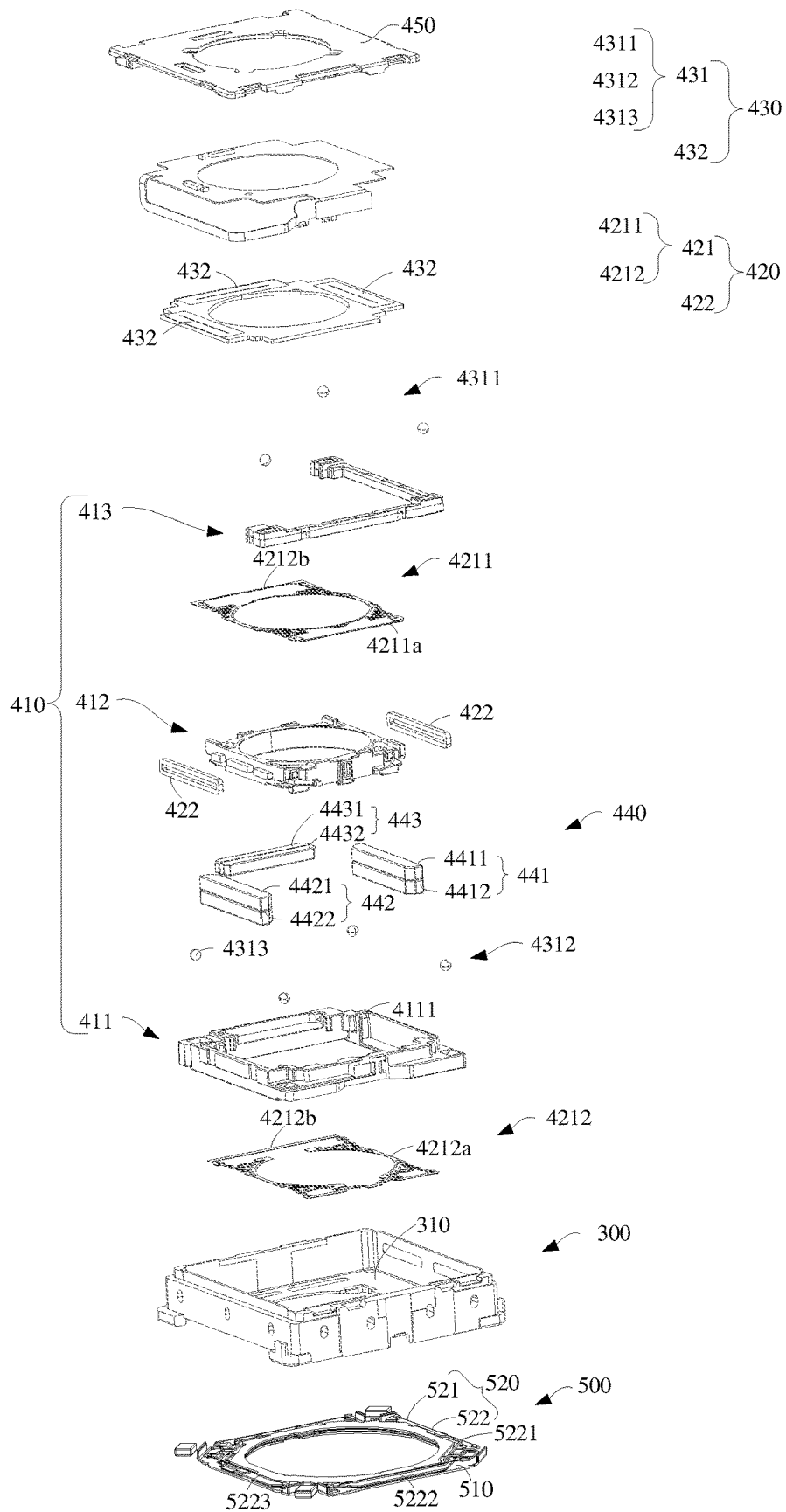
FIG. 6 is a schematic exploded view of the first bracket, the first driving motor and the second driving motor illustrated in FIG. 4.

Referring to FIG. 5 and FIG. 6, FIG. 5 is a schematic structural diagram illustrating the first bracket, the first driving motor and the second driving motor illustrated in FIG. 4, and FIG. 6 is a schematic exploded view of the first bracket, the first driving motor and the second driving motor illustrated in FIG. 4. The first driving motor 400 may include a carrier 410, a first driving module 420 and a second driving module 430. The carrier 410 has a receiving space, the lens 100 is accommodated in the receiving space and connected with the carrier 410. The first driving module 420 is arranged on the carrier 410. The first driving module 420 is able to drive the carrier 410 to move in a direction parallel to the optical axis of the lens 100, so as to drive the lens 100 to move in the direction parallel to the optical axis of the lens 100, thereby compensating for a shake amount of the lens 100 in the direction parallel to the optical axis of the lens 100. The second driving module 430 is arranged on the carrier 410, and the second driving module 430 is able to drive the carrier 410 to move along a direction perpendicular to the optical axis of the lens 100, so as to drive the lens 100 to move along the direction perpendicular to the optical axis of the lens 100, thereby compensating for a shake amount of the lens 100 in the direction perpendicular to the optical axis of the lens 100. Compared with the related art in which only one elastic-piece-type driving motor or one ball-type driving motor is used for displacements in both a horizontal direction and in a vertical direction, in the embodiments of the disclosure, two different driving modules are adopted to respectively drive the carrier 410 in two different directions. As such, it can avoid damage to some components of the driving module that would be caused when the same driving module simultaneously implements displacements in two different directions, so that the reliability of image stabilization provided by the first driving motor 400 is improved and the overall performance of the first driving motor 400 is enhanced.

In addition, the inventor has found, through long-term research, that the elastic-piece driving motors of some mobile phones usually use an elastic piece structure and a lifting ring wire structure to realize displacements of the driving motor in the horizontal direction and the vertical direction, so as to drive displacements of the lens in the horizontal direction and the vertical direction. However, the elastic piece structure and/or the lifting ring wire structure is prone to breakage in the process of implementing the displacement in the horizontal direction. The ball-type driving motors of some mobile phones usually use multiple balls to realize displacements of the driving motor in the horizontal direction and the vertical direction, so as to drive displacements of the lens in the horizontal direction and the vertical direction. However, in the process of implementing the displacement in the vertical direction, the multiple balls would collide with each other, which would easily cause dents on the multiple balls and thus leads to a problem of unsmooth rolling.

In view of this, in the embodiments of the present disclosure, the first driving module 420 includes an elastic structure 421, and the elastic structure 421 is configured to exert an elastic force to drive the carrier 410 to move along the direction parallel to the optical axis of the lens 100. The second driving module 430 includes a rolling structure 431, and the rolling structure 431 is configured to drive, through a rolling operation thereof, the carrier 410 to move along the direction perpendicular to the optical axis of the lens 100.

It may be understood that, in the embodiments of the present disclosure, the first driving module 420 enables the up-down movement of the carrier 410 through the elastic structure 421, and the second driving module 423 enables the left-right movement of the carrier 410 through the rolling structure 431. Compared with the related art, the elastic structure 421 can be prevented from being pulled simultaneously in two mutually perpendicular directions, such as that in implementing both the up-down movement and left-right movement, and thus the elastic structure 421 is not prone to breakage. In addition, those dents easily occurring in the up-down movement of the rolling structure 431 can be avoided, and thus the unsmooth rolling of the rolling structure 431 can be avoided.

It is notable that, all directional indications (such as upper, lower, left, right, front and rear) in the embodiments of the present disclosure are merely used to explain relative position relationships, movement conditions, and the like between components in a specific pose, and if the specific pose is changed, the directional indications are also changed accordingly.

The carrier 410 may include a first carrying member 411, a second carrying member 412 and a guiding member 413. Both of the second carrying member 412 and the guiding member 413 are provided on the first carrying member 411. The first carrying member 411 may have a regular shape. For example, the first carrying member 411 may be of a rectangular frame structure. Certainly, the first carrying member 411 may also have a rounded rectangle shape or an irregular shape.

The second carrying member 412 may be disposed in a through hole of the first carrying member 411 and is capable of moving in the through hole. The lens 100 may be disposed on the second carrying member 412, and the lens 100 may be driven to move when the second carrying member 412 moves. Exemplarily, the second carrying member 412 may also has a rectangular frame structure. The second carrying member 412 may be provided with a through hole, the lens 100 may penetrate the through hole and be fixed to a hole wall of the through hole.

The guiding member 413 is stacked on a part of the first carrying member 411 in the direction parallel to the optical axis of the lens 100, such that a part of the first carrying member 411 is exposed to the outside of the guiding member 413. For example, the guiding member 413 may include a first side portion and a second side portion which are connected with each other, and the guiding member 413 is substantially L-shaped. Compared with the related art in which the guiding member 413 is in a rectangular structure, the guiding member 413 of the embodiments of the disclosure may have a reduced volume, thereby reducing the space occupied by the guiding member 413 in the first driving motor 400, and facilitating the miniaturization of the first driving motor 400.

As illustrated in FIG. 6, the first driving motor 400 may further include a magnetic assembly 440, and the magnetic assembly 440 may be a permanent magnet or an electromagnet which is capable of generating a magnetic field. The magnetic assembly 440 may be provided on the carrier 410. The magnetic assembly 440 may include multiple magnetic elements, and each of the magnetic elements may include two magnets with opposite magnetic polarity.

The first driving module 420 is located in the magnetic field generated by the magnetic assembly 440. Under the action of the magnetic assembly 440, the first driving module 420 may drive the carrier 410 to move in the direction parallel to the optical axis of the lens 100. For example, the first driving module 420 may further include a first electric conductor 422, and the first electric conductor 422 is provided opposite to the magnetic assembly 440 in the direction perpendicular to the optical axis of the lens 100. Based on the Fleming's left-hand rule, the first electric conductor 422 may generate a magnetic field when being electrified, the magnetic field generated by the first electric conductor 422 and the magnetic field generated by the magnetic assembly 440 may interact to generate a first acting force (or a magnetic force) parallel to the direction of the optical axis of the lens 100. The elastic structure 421 can generate an elastic force perpendicular to the lens 100. The first acting force and the elastic force act on the carrier 410 at the same time, and the carrier 410 may move up and down under the driving of the first acting force and the elastic force. Accordingly, the lens 100 is driven to move up and down, so as to achieve automatic focusing of the lens 100 and/or compensate for shaking of the lens 100 in the vertical direction.

The first driving module 420 may include two first electric conductors 4222 which are provided on two sides of the second carrying member 412 in the direction perpendicular to the optical axis of the lens 100. The two first electric conductors 422 may be of the same structure. For example, each of the two first electric conductors 422 may be of an annular structure illustrated in FIG. 6. Certainly, the two first electric conductors 422 each may be of a single-rod structure or a double-rod structure. In some embodiments, the structures of the two first electric conductors 422 may also be different. For example, one first electric conductor 422 may be of the annular structure, and the other first electric conductor 422 may be of the single-rod structure or the double-rod structure.

The magnetic assembly 440 may include a first magnetic element 441, a second magnetic element 442, and a third magnetic element 443. Each of the first magnetic element 441, the second magnetic element 442, and the third magnetic element 443 may be provided on the first carrying member 411.

One first electric conductor 422 is located in the magnetic field generated by the first magnetic element 441. The one first electric conductor 422, when being electrified, may generate a magnetic field, which may interact with the magnetic field generated by the first magnetic element 441 to generate a pushing force acting on the second carrying member 412.

The first magnetic element 441 may include a first magnet 4411 and a second magnet 4412. The magnetic polarity of the first magnet 4411 is opposite to the magnetic polarity of the second magnet 4412. For example, the first magnet 4411 may be a south pole, and the second magnet 4412 may be a north pole; alternatively, the first magnet 4411 may be a north pole, and the second magnet 4412 may be a south pole. In addition, the first magnet 4411 and the second magnet 4412 are stacked in the direction parallel to the optical axis of the lens. A portion of one first electric conductor 422 is arranged opposite to the first magnet 4411, and a portion of the first electric conductor 422 is arranged opposite to the second magnet 4412. Taking the first electric conductor 422 of the annular structure as an example, the first electric conductor 422 may include a first part, a second part, a third part and a fourth part, in which the first part and the second part extend in the direction perpendicular to the optical axis of the lens 100, the third part and the fourth part extend in the direction parallel to the optical axis of the lens 100, the first part is provided opposite to the first magnet 4411, and the second part is provided opposite to the second magnet 4412.

The second magnetic element 442 is disposed opposite to the other first electric conductor 422 in the direction perpendicular to the optical axis of the lens 100. As such, the other first electric conductor 422 is located in a magnetic field generated by the second magnetic element 442. The other first electric conductor 422 may generate a magnetic field when being electrified, and such magnetic field interacts with the magnetic field generated by the second magnetic element 442 to generate a pushing force acting on the second carrying member 412. The second carrying member 412 moves up and down relative to the first carrying member 411, under the action of the pushing forces exerted by the two first electric conductors and the elastic force generated by the elastic structure.

The pushing force that is generated by the other first electric conductor 422 and acts on the second carrying member 412 may be equal to the pushing force that is generated by the one first electric conductor 422 and acts on the second carrying member 412, so that the pushing forces acting on both sides of the second carrying member 412 are balanced, and the both sides of the second carrying member 412 move up and down at the same speed. Certainly, the pushing force that is generated by the other first electric conductor 422 and acts on the second carrying member 412 may be unequal to the pushing force that is generated by the one first electric conductor 422 and acts on the second carrying member 412, so that the pushing forces acting on both sides of the second carrying member 412 are unbalanced, and the both sides of the second carrying member 412 move up and down at different speeds, which enables a deflection of the second carrying member 412 at a certain angle.

In the embodiments of the disclosure, the structure of the second magnetic element 442 may be the same as the structure of the first magnetic element 441. For example, the second magnetic element 442 may include a third magnet 4421 and a fourth magnet 4422. The magnetic polarity of the third magnet 4421 is opposite to the magnetic polarity of the fourth magnet 4422. For example, the third magnet 4421 may be a south pole and the fourth magnet 4422 may be a north pole; or the third magnet 4421 may be a north pole and the fourth magnet 4422 may be a south pole. Moreover, the third magnet 4421 and the fourth magnet 4422 are stacked in the direction parallel to the optical axis of the lens. A portion of the other first electric conductor 422 is arranged opposite to the third magnet 4421, and a portion of the other first electric conductor 422 is arranged opposite to the fourth magnet 4422. Details can be found in the related description of the one first electric conductor 422 and the first magnetic element 441, which will not be repeated herein.

The structure of the third magnetic element 443 is different from the structure of the first magnetic element 441 and the structure of the second magnetic element 442. The third magnetic element 443 may include a fifth magnet 4431 and a sixth magnet 4432 which are stacked in the direction perpendicular to the optical axis of the lens 100. The magnetic polarity of the fifth magnet 4431 is opposite to the magnetic polarity of the sixth magnet 4432. For example, the fifth magnet 4431 may be a south pole, and the sixth magnet 4432 may be a north pole; or the fifth magnet 4431 may be a north pole, and the sixth magnet 4432 may be a south pole.

The elastic structure 421 may include an upper elastic piece 4211 and a lower elastic piece 4212 which are provided on both sides of the second carrying member 412, respectively. For example, the second carrying member 412 has a first side and a second side opposite to the first side, the upper elastic piece 4211 is arranged on the first side, and the lower elastic piece 4212 is arranged on the second side. A portion of the upper elastic piece 4211 and a portion of the lower elastic piece 4212 each are connected with the first carrying member 411. Exemplarily, the upper elastic piece 4211 may include a first main body part 4211*a* and a first connecting part 4211*b* connected to each other. The first main body part 4211*a* is provided on the first side of the second carrying member 412, the first connecting part 4211*b* is connected with the first carrying member 411. An elastic force acting on the second carrying member 412 may be generated between the first main body part 4211*a* and the first connecting part 4211*b*.

The lower elastic piece 4212 may include a second main body part 4212*a* and a second connecting part 4212*b* connected to each other. The second main body part 4212*a* is provided on the second side of the second carrying member 412, and the second connecting part 4212*b* is connected with the first carrying member 411. An elastic force acting on the second carrying member 412 may be generated between the second main body part 4212*a* and the second connecting part 4212*b*. The elastic force generated by the elastic structure 421 is a combination of the elastic force generated by the lower elastic piece 4212 and the elastic force generated by the upper elastic piece 4211.

In the embodiments of the disclosure, the second driving module 430 is located in the magnetic field generated by the magnetic assembly 440. Under the action of the magnetic assembly 440, the second driving module 430 may drive the carrier 410 to move in the direction perpendicular to the optical axis of the lens 100. For example, the second driving module 430 may include a second electric conductor 432 which is provided opposite to the magnetic assembly 440 in the direction parallel to the optical axis of the lens 100. Based on the Fleming's left-hand rule, the second electric conductor 432 may generate a magnetic field when being electrified, the magnetic field generated by the second electric conductor 432 and the magnetic field generated by the magnetic assembly 440 may interact to generate a second acting force (or a magnetic force) perpendicular to the direction of the optical axis of the lens 100. The second acting force acts on the carrier 410 to drive the carrier 410 to move, through the rolling structure 431, in the direction perpendicular to the optical axis of the lens 100, so as to compensate for the shake of the lens 100 in the horizontal direction.

The second driving module 430 may include three second electric conductors. In the direction parallel to the optical axis of the lens 100, one second electric conductor 432 is provided opposite to the first magnetic element 441 so that the one second electric conductor 432 is located within the magnetic field generated by the first magnetic member 441. The second electric conductor 432 may generate a magnetic field when being electrified, and such magnetic field interacts with the magnetic field generated by the first magnetic element 441 to generate a pushing force acting on the first carrying member 411. Under the action of the pushing force, the first carrying member 411 drives the second carrying member 412 and the guiding member 413 to move, based on the rolling operation of the rolling structure 431, together with the first carrying member 411 in the direction perpendicular to the optical axis of the lens 100 (or move left and right), so as to compensate for the shake of the lens 100 in the horizontal direction.

The rolling structure 431 may include multiple first balls 4311 and multiple second balls 4312, and the multiple first balls 4311 and the multiple second balls 4312 are all arranged on the carrier 410. The second acting force generated by the second electric conductor 432 can drive the carrier 410 to move, based on the multiple first balls 4311, along a first sub-direction and/or driving the carrier 410 to move, based on the multiple second balls 4312, along a second sub-direction. The first sub-direction and the second sub-direction are both perpendicular to the direction of the optical axis of the lens 100, and the first sub-direction is perpendicular to the second sub-direction.

It can be understood that the movement of the lens 100 may be decomposed into movements in three directions such as X, Y and Z directions, in which both of the X direction and the Y direction are perpendicular to the Z direction, and the X direction and the Y direction are perpendicular to each other on a plane perpendicular to the Z direction. The Z direction may be understood as a direction parallel to the optical axis of the lens 100, and the X direction and the Y direction may be understood as two sub-directions perpendicular to the optical axis of the lens 100. The X direction may be understood as the first sub-direction, and the Y direction can be understood as the second sub-direction. With regard to the three second electric conductors 432, the second acting force, which is generated by the second electric conductor 432 opposite to the first magnetic element 441 and the second electric conductor 432 opposite to the second magnetic element 442, can drive the carrier 410 to move, based on the multiple first balls 4311, along the X direction; and the second acting force, which is generated by the second electric conductor 432 opposite to the third magnetic element 443, can drive the carrier 410 to move along the Y direction based on the multiple second balls 4312.

Specifically, the multiple first balls 4311 are disposed on a side of the guiding member 413 facing away from the first carrying member 411, and the multiple second balls 4312 are sandwiched between the guiding member 413 and the first carrying member 411. As such, the first carrying member 411 may move, based on the multiple first balls 4311, relative to the first bracket 300 along the first sub-direction (or the X direction), and the first carrying member 411 also drives the guiding member 413 and the second carrying member 412 to move in the first sub-direction, so that the first driving motor 400 can compensate the lens 100 in the first sub-direction; and/or the first carrying member 411 may move, based on the multiple second balls 4312, relative to the first bracket 300 along the second sub-direction (or the Y direction), and the first carrying member 411 also drives the guiding member 413 and the second carrying member 412 to move in the second sub-direction, so that the first driving motor 400 can compensate the lens 100 in the second sub-direction.

The first carrying member 411 is provided with a groove 4111 and a protruding portion 4112 adjacent to the groove 4111. The guiding member 413 is accommodated in the groove 4111, and an outer surface of the protruding portion 4112 and an outer surface of the guiding member 413 are substantially flush. The substantially flush may be understood as a case where the two outer surfaces are flush with each other within a permissible error in the field.

The rolling structure 431 may further include a third ball 4313 provided on the carrier 410. Multiple third balls 4313 can enable the carrier 410 to move relative to the first bracket 300 along the first sub-direction and/or the second sub-direction. The third ball 4313 is disposed on the protruding portion 4112. The second acting force, which is generated by the second electric conductor 432, can drive the carrier 410 to move, based on the multiple first balls 4311 and the third ball 4313, along the first sub-direction, or drive the carrier 410 to move, based on the multiple second balls 4312 and the third ball 4313, in the second sub-direction.

In the related art, the ball-type driving motor is generally provided with eight balls, four of the eight balls are configured to enable the movement of the carrier in the X direction, and the other four balls are configured to enable the movement of the carrier in the Y direction. In the embodiments of the disclosure, by providing the third ball 4313 that can roll along the first sub-direction (or X-direction) as well as rolling along the second sub-direction (or Y-direction), it is possible to share one ball between the multiple first balls 4311 capable of rolling in the first sub-direction and the multiple second balls 4312 capable of rolling in the second sub-direction. In this way, compared with the related art, one ball can be saved, a component of the first driving motor 400 can be reduced, and a structure of the first driving motor 400 can be simplified.

The first driving motor 400 may further include a cover 450. The cover 450 is connected with the first bracket 300 to define an accommodation space between the first bracket 300 and the cover 450, and the carrier 410 is movably accommodated in the accommodation space. It can be understood that the carrier 410 can move up and down and/or move left and right in the accommodation space. The multiple first balls 4311 are sandwiched between the cover 450 and the guiding member 413, so that the guiding member 413 can move left and right relative to the cover 450. The third ball 4313 is sandwiched between the cover 450 and the first carrying member 411, so that the first carrying member 411 can move left and right relative to the cover 450.

When it is required to realize the focusing of the lens 100 and/or compensate for the shake in the vertical direction (or Z direction), the two first electric conductors 422 may be electrified based on the compensation data, and the two first electric conductors 422 may generate the magnetic fields when being electrified. The generated magnetic fields interact with the magnetic fields of the first magnetic element 441 and the second magnetic element 442 respectively to generate the pushing forces acting on the second carrying member 412, thereby driving the second carrying member 412 to move up and down in the through hole of the first carrying member 411. The movement of the second carrying member 412 can drive the lens 100 to move up and down, so that a distance between the lens 100 and the photosensitive chip 460 is changed for the focusing. In addition, the shake of the lens in the direction parallel to the lens 100 may be compensated when the lens 100 moves up and down.

When it is required to compensate for the shake in the first sub-direction (or the X direction), one or two of the two second electric conductors 432, which are opposite to the first magnetic element 441 and the second magnetic element 442 respectively, may be electrified based on the first compensation data. The second electric conductor 432 may generate the magnetic field when being electrified. The generated magnetic field(s) interacts with the magnetic fields of the first magnetic element 441 and/or the second magnetic element 442 to generate the pushing force acting on the first carrying member 411, thereby driving the first carrying member 411 and thus the second carrying member 412 and the guiding member 413 to move, based on the multiple first balls 4311 and the third ball 4313, left and right in the first sub-direction (or the X direction), relative to the cover 450 and the first bracket 300. The movement of the second carrying member 412 may drive the lens 100 to move left and right together in the first sub-direction (or the X direction), thereby compensating for the shake of the lens 100 in the first sub-direction.

When it is required to compensate for the shake in the second sub-direction (or the Y direction), the second electric conductor 432 opposite to the third magnetic element 443 may be electrified based on the first compensation data. The second electric conductor 432 may generate the magnetic field when being electrified. The generated magnetic field interacts with the magnetic field of the third magnetic element 443 to generate the pushing force acting on the first carrying member 411, thereby driving the first carrying member 411 and thus the second carrying member 412 and the guiding member 413 to move, based on the multiple second balls 4312 and the third ball 4313, left and right in the second sub-direction (or the Y direction), relative to the cover 450 and the first bracket 300. The movement of the second carrying member 412 may drive the lens 100 to move left and right together in the second sub-direction (or the Y direction), thereby compensating for the shake of the lens 100 in the second sub-direction (or the Y direction).

In the embodiments of the disclosure, the second driving motor 500 may include a base plate 510 and a deformable element 520. The base plate 510 may provide support for other components of the second driving motor 500, and the deformable element 520 may be deformed to drive the photosensitive element 200 to move in the direction vertical to the optical axis of the lens 100 (including the X direction and/or the Y direction), thereby realizing the optical image stabilization function of the photosensitive element 200. The deformable element 520 may include a fixed portion 521 and a deformable portion 522. The fixed portion 521 is fixedly connected to the base plate 510. The deformable portion 522 is connected with the photosensitive element 200, and the deformable portion 522 may be electrified based on the compensation data. The deformable portion 522 may be deformed when being electrified, so as to drive the photosensitive element 200 to move, relative to the base plate 510, along the direction perpendicular to the optical axis of the lens 100. The deformable portion 522 may include a first part 5221, a second part 5222 and a third part 5223. The different parts of the deformable portion are energized with different currents based on the compensation data, so that the first part 5221, the second part 5222 and the third part 5223 may produce the same or different deformations, thereby driving the photosensitive element 200 to translate relative to the base plate 510 along the direct perpendicular to the optical axis of the lens 100 and to rotate around the direction of the optical axis of the lens 100. Since the translation and the rotation of the photosensitive element 200 share the same travel (where both the translation and the rotation are achieved through the deformation of the deformable portion 522), the rotation cannot be further implemented when the translation amount reaches the maximum travel; and the translation cannot be further implemented when the rotation reaches the maximum travel. Based on this, the movements of the lens and the photosensitive element are set appropriately through the above optical image stabilization method of the disclosure, so as to achieve the image stabilization for a shake of large degree. The deformable portion 522 may be made of a shape memory alloy (SMA). The SMA, when being electrified, may be heated and deformed. The length of the deformable portion 522 may be changed when the SMA is deformed, so as to drive the photosensitive element 200 connected with the deformable portion 522 to move, thereby realizing the image stabilization function of the photosensitive element 200.

Since there are two driving motors such as the first driving motor 400 and the second driving motor 500 in the camera module 20, it is necessary to set two driving chips in the camera module 20 to respectively control the first driving motor 400 and the second driving motor 500.

Figure 7:
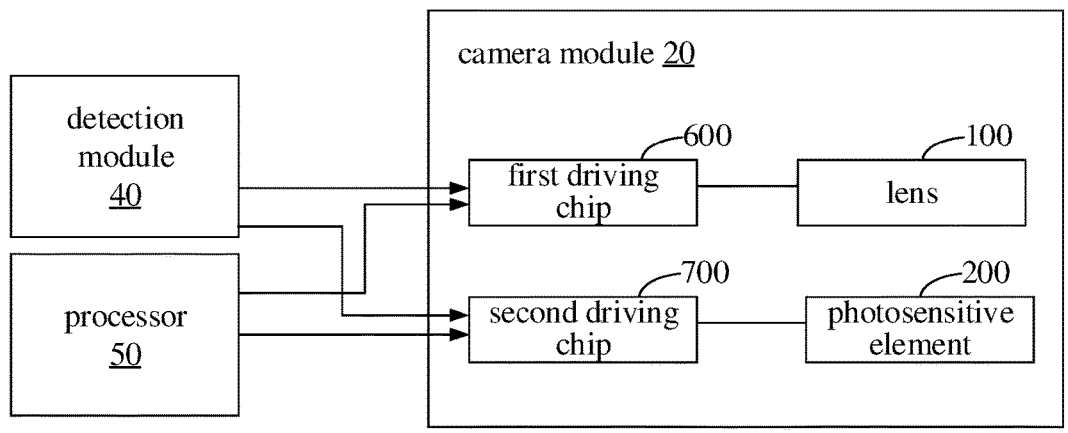
FIG. 7 is a first schematic structural diagram illustrating an optical image stabilization system according to some embodiments of the disclosure.

Referring to FIG. 7, FIG. 7 is a first schematic structural diagram illustrating an optical image stabilization according to some embodiments of the disclosure.

The optical image stabilization system 2000 includes the camera module 20 as described in the above embodiments of the disclosure and a detection module 40. The camera module 20 includes a lens 100, a photosensitive element 200, a first driving chip 600 and a second driving chip 700. The first driving chip 600 is connected with the lens 100, and the second driving chip 700 is connected with the photosensitive element 200. The connection used in the embodiments of the disclosure may refer to a direct connection or an indirect connection through other devices. For example, the first driving chip 600 may be connected with the lens 100 through the first driving motor, and the first driving chip 600 may control the first driving motor to drive the lens 100. The second driving chip 700 may be connected with the photosensitive element 200 through the second driving motor, and the second driving chip 700 may control the second driving motor 500 to drive the photosensitive element 200.

The detection module 40 acquires shake data of the camera module, and transmits the shake data to the first driving chip 600 and/or the second driving chip 700. In response to the shake data being less than or equal to a first threshold, based on the shake data and a first compensation strategy, the first driving chip drives the lens to move and/or the second driving chip drives the photosensitive element to move. In response to the shake data being greater than the first threshold, based on the shake data and a second compensation strategy, the first driving chip drives the lens to move and the second driving chip drives the photosensitive element to move.

The optical image stabilization system further includes a processor 50. The processor 50 is configured to transmit a control signal to the first driving chip 600 and the second driving chip 700, and the first driving chip 600 and the second driving chip 700 process the shake data based on the control signal.

It can be understood that both of the first driving chip 600 and the second driving chip 700 have a capability of processing the shake data to obtain the compensation data. The optical image stabilization system 2000 can implement the above optical image stabilization method, which will not be repeated here.

Figure 8:
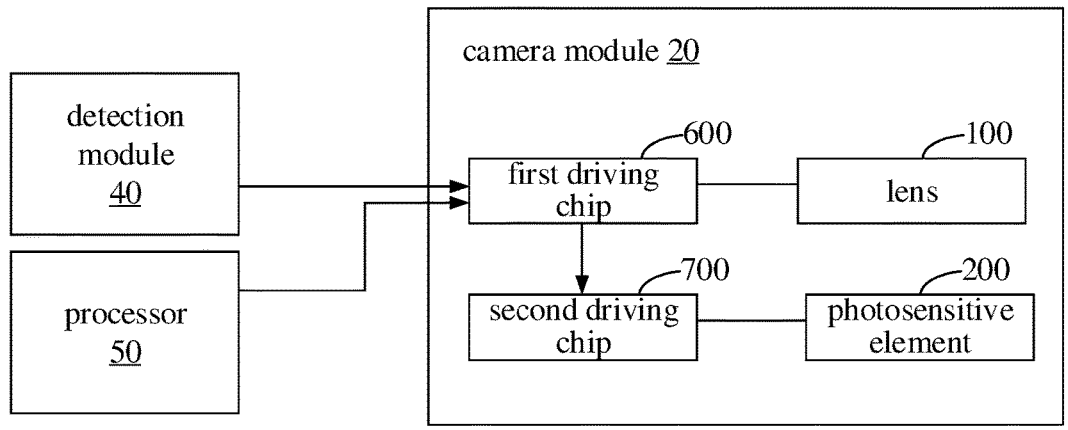
FIG. 8 is a second schematic structural diagram illustrating the optical image stabilization system according to some embodiments of the disclosure.

In order to reduce the computation of the second driving chip and improve the synergy between the first driving chip and the second driving chip, the embodiments of the disclosure provide another optical image stabilization system. Referring to FIG. 8, FIG. 8 is a second schematic structural diagram illustrating the optical image stabilization system according to the embodiments of the disclosure.

The optical image stabilization system 2000 may include the camera module 20 as described in the above embodiments of the disclosure and a detection module 40. The camera module 20 includes a first driving chip 600 and a second driving chip 700. The first driving chip 600 is connected with the lens 100, and the second driving chip 700 is connected with the photosensitive element 200. The connection used in the embodiments of the disclosure may refer to a direct connection or an indirect connection through other devices. For example, the first driving chip 600 may be connected with the lens 100 through the first driving motor, and the first driving chip 600 may control the first driving motor to drive the lens 100. The second driving chip 700 may be connected with the photosensitive element 200 through the second driving motor, and the second driving chip 700 may control the second driving motor 500 to drive the photosensitive element 200.

The detection module 40 may be connected with the first driving chip 600. The detection module 40 may acquire shake data of the camera module 20, and transmit the shake data of the camera module 20 to the first driving chip 600.

The first driving chip 600 may process the shake data of the camera module 20 and obtain the compensation data through the processing. By analyzing the compensation data through a judgment logic in the above optical image stabilization method, a translation amount for the lens and/or a translation amount for the photosensitive element and/or a rotation amount for the photosensitive element may be obtained. The translation amount for the photosensitive element and/or the rotation amount for the photosensitive element is sent to the second driving chip 700, so that the second driving chip 700 controls the second driving motor to drive the photosensitive element 200 to move, based on the translation amount for the photosensitive element and/or the rotation amount for the photosensitive element. The first driving chip 600 controls, based on the obtained translation amount for the lens, the first driving motor to drive the lens to move.

It can be understood that, the first driving chip 600 calculates, based on the shake data, a shake compensation amount for the lens 100 and a shake compensation amount for the photosensitive element 200, and the first driving chip 600 transmits the shake compensation amount for the photosensitive element 200 to the second driving chip 700. Compared with a case where two driving chips perform respective calculations based on the shake data of the camera module 20, the first driving chip 600 and the second driving chip 700 of the embodiments of the disclosure can work cooperatively, and the link between the first driving chip 600 and the second driving chip 700 is strengthened.

Since the specific calculation of the shake compensation amount is completed by the first driving chip 600, the second driving chip 700 only needs to control, based on the received shake compensation data, the photosensitive element 200 without performing calculations, so that the structure of the second driving chip 700 can be simplified.

The optical image stabilization system further includes a processor 50. The processor 50 is configured to transmit a control signal to the first driving chip 600, and the first driving chip 600 processes the shake data based on the control signal.

Figure 9:
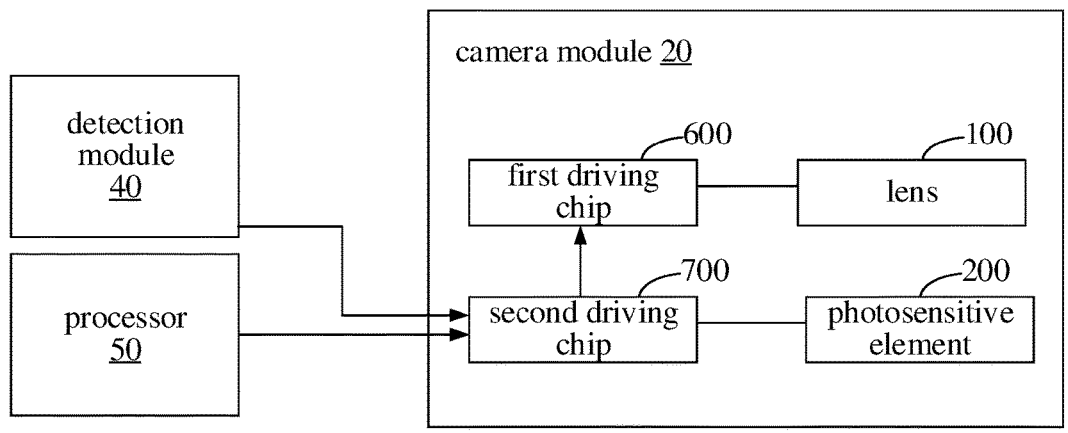
FIG. 9 is a third schematic structural diagram illustrating the optical image stabilization system according to some embodiments of the disclosure.

In order to reduce the computation of the first driving chip and improve the synergy between the first driving chip and the second driving chip, the embodiments of the disclosure provide still another optical image stabilization system. Referring to FIG. 9, FIG. 9 is a third schematic structural diagram illustrating the optical image stabilization system according to the embodiments of the disclosure.

The optical image stabilization system 2000 may include the camera module 20 as described in the above embodiments of the disclosure and a detection module 40. The camera module 20 includes a first driving chip 600 and a second driving chip 700. The first driving chip 600 is connected with the lens 100, and the second driving chip 700 is connected with the photosensitive element 200. The connection used in the embodiments of the disclosure may refer to a direct connection or an indirect connection through other devices. For example, the first driving chip 600 may be connected with the lens 100 through the first driving motor, and the first driving chip 600 may control the first driving motor to drive the lens 100. The second driving chip 700 may be connected with the photosensitive element 200 through the second driving motor, and the second driving chip 700 may control the second driving motor 500 to drive the photosensitive element 200.

The detection module 40 may be connected with the second driving chip 700. The detection module 40 may acquire shake data of the camera module 20, and transmit the shake data of the camera module 20 to the second driving chip 700. The second driving chip 700 may process the shake data of the camera module 20 and obtain the compensation data through the processing. By analyzing the compensation data through a judgment logic in the above optical image stabilization method, a translation amount for the lens and/or a translation amount for the photosensitive element and/or a rotation amount for the photosensitive element can be obtained. The translation amount for the lens is sent to the first driving chip 600, so that the first driving chip 600 controls the first driving motor to drive the lens 100 to move, based on the translation amount for the lens. The second driving chip 700 controls, based on the obtained translation amount for the photosensitive element and the rotation amount for the photosensitive element, the second driving motor to drive the photosensitive element to move.

It can be understood that, the second driving chip 700 may transform a total offset of the camera module 20 into a shake compensation amount for the lens 100 and a shake compensation amount for the photosensitive element 200, and the second driving chip 700 transmits the shake compensation amount for the lens 100 to the first driving chip 600. Compared with a case where two driving chips perform respective calculations based on the shake data of the camera module 20, the first driving chip 600 and the second driving chip 700 of the embodiments of the disclosure can work cooperatively, and the link between the first driving chip 600 and the second driving chip 700 is strengthened.

Since the specific calculation of the shake compensation amount is completed by the second driving chip 700, the first driving chip 600 only needs to control, based on the received shake compensation data, the lens 100 without performing calculations, so that a structure of the first driving chip 600 can be simplified.

The optical image stabilization system further includes a processor 50. The processor 50 is configured to transmit a control signal to the second driving chip 700, and the second driving chip 700 processes the shake data based on the control signal.

Figure 10:
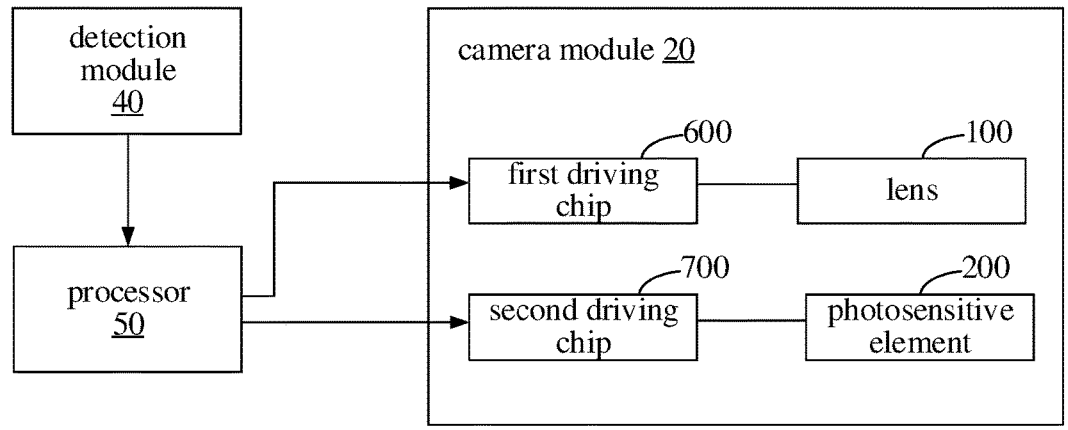
FIG. 10 is a fourth schematic structural diagram illustrating the optical image stabilization system according to some embodiments of the disclosure.

In order to reduce the computation of the first driving chip and the second driving chip, the embodiments of the disclosure provide yet another optical image stabilization system. Referring to FIG. 10, FIG. 10 is a fourth schematic structural diagram illustrating the optical image stabilization system according to some embodiments of the disclosure.

The difference between the optical image stabilization system in the embodiment of this figure and the above dual image stabilization system 2000 is that neither the first driving chip 600 nor the second driving chip 700 is connected with the detection module 40. Instead, the detection module 40 is connected with the processor 50, the processor 50 is connected with each of the first driving chip 600 and the second driving chip 700. The processor 50 processes the shake data of the camera module 20 detected by the detection module 40 to obtain compensation data for the lens and compensation data for the photosensitive element, and the processor 50 transmits the compensation data for the lens 100 to the first driving chip 600 and transmits the compensation data for the photosensitive element 200 to the second driving chip 700. The first driving chip 600 controls, based on the compensation data for the lens, the lens 100 to move. The second driving chip 700 controls, based on the compensation data for the photosensitive element 200, the photosensitive element 200 to move.

It can be understood that the data detected by the detection module 40 may be directly transmitted to the processor 50. The processor 50 may convert a total offset of the camera module 20 into a shake compensation amount for the lens 100 and a shake compensation amount for the photosensitive element 200. The processor 50 transmits the shake compensation amount for the lens 100 to the first driving chip 600 and transmits the shake compensation amount for the photosensitive element 200 to the second driving chip 700. Compared with a case where the detection module 40 transmits the data to the first driving chip 600 and the second driving chip 700, the route can be simplified to a certain extent in the embodiments of the disclosure.

In the embodiments of the disclosure, the data processing is handled by the processor 50, the first driving chip 600 and the second driving chip 700 only need to control, based on the received compensation data, the lens 100 and the photosensitive element 200 respectively, without performing any calculation. Therefore, the structure of the first driving chip 600 and the structure of the second driving chip 700 can be simplified, thereby reducing the manufacturing cost of the first driving chip 600 and the second driving chip 700.

It is notable that, the optical image stabilization systems according to the embodiments of the disclosure are only exemplary, and all systems capable of implementing the above optical image stabilization method shall fall within the scope of the disclosure.

Figure 11:
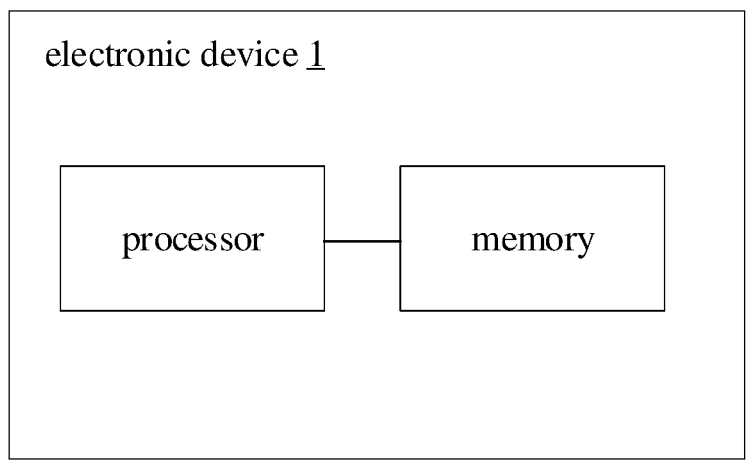
FIG. 11 is a second schematic structural diagram illustrating the electronic device according to some embodiments of the disclosure.

An electronic device is further provided by the disclosure. Referring to FIG. 11, FIG. 11 is a second schematic structural diagram illustrating the electronic device according to some embodiments of the disclosure. The electronic device 1 includes a processor and a memory. The processor is electrically connected with the memory.

The processor is a control center of the electronic device, and it uses various interfaces and lines to connect various parts of the entire electronic device. The processor executes or loads computer programs stored in the memory, and calls data stored in the memory, to implement various functions of the electronic device 500 and process the data.

The memory may be used to store software programs and modules. The processor realizes various functional applications and processes the data by executing the computer programs and the modules stored in the memory. The memory may mainly include a program storage area and a data storage area. The program storage area may store an operating system, computer programs required by at least one function (such as a sound playback function and an image playback function), or the like. The data storage area may store data created by the use of the electronic device, etc.

In addition, the memory may include a high-speed random access memory, and the memory may further include a non-volatile memory, for example, at least one disk storage device, a flash memory device, or another volatile solid-state storage device. Correspondingly, the memory 502 may further include a memory controller to provide the processor with access to the memory.

In the embodiments of the disclosure, the memory of the electronic device performs the operations as follows. The processor loads instructions corresponding to the process of one or more computer programs into the memory, and the processor executes the computer programs stored in the memory to implement the above optical image stabilization method.

The embodiments of the disclosure further provide a storage medium. The storage medium stores computer programs thereon. The computer programs, when being executed by a computer, cause the computer to implement the optical image stabilization method according to any of the above embodiments.

In the embodiments of the disclosure, the storage medium may be a magnetic disk, an optical disk, a read only memory (ROM), or a random access memory (RAM), and the like.

In the foregoing embodiments, the description of the various embodiment has respective focuses. For a part that is not described in detail in an embodiment, reference may be made to related descriptions in other embodiments.

It should be noted that, for the optical image stabilization method described in the embodiments of the disclosure, it can be understood by those of ordinary skill in the art that all or part of the process for implementing the optical image stabilization method described in the embodiments of the disclosure may be accomplished by controlling relevant hardware using computer programs. The computer programs may be stored in the non-transitory computer-readable storage medium, such as the memory of the electronic device, and executed by at least one processor of the electronic device, and the execution process may include a process as described in implementations of the optical image stabilization method. The storage medium may be a magnetic disk, an optical disk, a read only memory (ROM), a random access memory (RAM), etc.

The optical image stabilization method and system, the non-transitory computer-readable storage medium, and the electronic device provided in the embodiments of the disclosure are described in detail above. The principles and implementations of the present disclosure have been described herein with reference to specific examples, and the description of the above embodiments is only used to help understanding of the present disclosure. In addition, for those skilled in the art, according to the idea of the present disclosure, changes may be made to the specific implementations and application scopes. In conclusion, the contents of the specification should not be understood as a limitation on the disclosure.

What is claimed is:

1. An optical image stabilization method, wherein the method is implemented by a camera module comprising a lens and a photosensitive element, and the method comprises:
   acquiring shake data of the camera module;
   in response to the shake data being less than or equal to a first threshold, driving, based on the shake data and a first compensation strategy, at least one of the lens and the photosensitive element to move; and
   in response to the shake data being greater than the first threshold, driving, based on the shake data and a second compensation strategy, the lens and the photosensitive element to move;
   wherein driving, based on the shake data and the first compensation strategy, at least one of the lens and the photosensitive element to move, comprises:
      determining first compensation data based on the shake data;
      in response to the first compensation data only comprising a first translation amount for the lens, driving, based on the first compensation data, the lens to move; and
      in response to the first compensation data comprising a second translation amount for the lens and a first rotation amount for the photosensitive element, driving, based on the first compensation data, the lens and the photosensitive element to move.

2. The optical image stabilization method as claimed in claim 1, wherein driving, based on the first compensation data, the lens to move, comprises:

driving, based on the first compensation data, the lens to translate; and wherein driving, based on the first compensation data, the lens and the photosensitive element to move, comprises:
    driving, based on the first compensation data, the lens to translate and the photosensitive element to rotate.

3. The optical image stabilization method as claimed in claim 2, wherein driving, based on the first compensation data, the lens to translate, comprises:
    driving, based on the first translation amount, the lens to translate; and wherein driving, based on the first compensation data, the lens to translate and the photosensitive element to rotate, comprises:
    driving, based on the second translation data, the lens to translate; and
    driving, based on the first rotation amount, the photosensitive element to rotate.

4. The optical image stabilization method as claimed in claim 1, wherein determining the first compensation data based on the shake data comprises:
    determining, based on the shake data, current positions of the lens and the photosensitive element;
    comparing the current positions of the lens and the photosensitive element with initial positions of the lens and the photosensitive element;
    in response to determining, through the comparison, only a translation offset of the camera module, determining the first translation amount based on the translation offset; and
    in response to determining, through the comparison, both a translation offset of the camera module and a rotation offset of the camera module, determining, based on the translation offset and the rotation offset, the second translation amount and first rotation amount.

5. The optical image stabilization method as claimed in claim 1, wherein the second compensation strategy comprises a first sub-strategy and a second sub-strategy, and driving, based on the shake data and the second compensation strategy, the lens and the photosensitive element to move in response to the shake data being greater than the first threshold, comprises:
    in response to the shake data being greater than the first threshold and being less than or equal to a second threshold, driving, based on the shake data and the first sub-strategy, the lens and the photosensitive element to move; and
    in response to the shake data being greater than the second threshold, driving, based on the shake data and the second sub-strategy, the lens and the photosensitive element to move.

6. The optical image stabilization method as claimed in claim 5, wherein driving, based on the shake data and the first sub-strategy, the lens and the photosensitive element to move, comprises:
    determining second compensation data based on the shake data;
    in response to the second compensation data comprising a third translation amount for the lens and a fourth translation amount for the photosensitive element, driving, based on the second compensation data, the lens to translate and the photosensitive element to translate; and
    in response to the second compensation data comprising a fifth translation amount for the lens, a sixth translation amount for the photosensitive element, and a second rotation amount for the photosensitive element, driving, based on the second compensation data, the lens to translate and the photosensitive element to translate and rotate.

7. The optical image stabilization method as claimed in claim 6, wherein driving, based on the second compensation data, the lens to translate and the photosensitive element to translate, comprises:
    driving, based on the third translation amount, the lens to translate, and driving, based on the fourth translation amount, the photosensitive element to translate; and wherein driving, based on the second compensation data, the lens to translate and the photosensitive element to translate and rotate, comprises:
    driving, based on the fifth translation amount, the lens to translate, driving, based on the sixth translation amount, the photosensitive element to translate, and driving, based on the second rotation amount, the photosensitive element to rotate.

8. The optical image stabilization method as claimed in claim 6, wherein determining the second compensation data based on the shake data comprises:
    in response to determining that the shake data is only contributed by a translation offset of the camera module, determining, based on the shake data and current positions of the lens and the photosensitive element, the third translation amount and the fourth translation amount; and
    in response to determining that the shake data is further contributed by a rotation offset of the camera module, determining, based on the shake data and current positions of the lens and the photosensitive element, the fifth translation amount, the sixth translation amount, and the second rotation amount.

9. The optical image stabilization method as claimed in claim 5, wherein driving, based on the shake data and the second sub-strategy, the lens and the photosensitive element to move, comprises:
    determining, based on the shake data, a seventh translation amount and an eighth translation amount; and
    driving, based on the seventh translation amount, the lens to translate, and driving, based on the eighth translation amount, the photosensitive element to translate.

10. An optical image stabilization system, comprising a detection module and a camera module, wherein the camera module comprises a lens, a photosensitive element, a first driving chip and a second driving chip; the first driving chip is connected with the lens, and the second driving chip is connected with the photosensitive element;
    the detection module is configured to acquire shake data of the camera module;
    when the shake data is less than or equal to a first threshold, based on the shake data and a first compensation strategy, at least one of the lens and the photosensitive element is driven to move; and
    when the shake data is greater than the first threshold, based on the shake data and a second compensation strategy, each of the lens and the photosensitive element is driven to move;
    wherein moving of the lens is driven by the first driving chip, and moving of the photosensitive element is driven by the second driving chip; and
    wherein the optical image stabilization system further comprises a processor, the processor is configured to transmit a control signal to the first driving chip and the second driving chip, and each of the first driving chip and the second driving chip is configured to process the shake data based on the control signal.

11. The optical image stabilization system as claimed in claim 10, wherein the camera module further comprises a first driving motor and a second driving motor, the first driving chip is connected with the lens through the first driving motor, the first driving chip is configured to drive the lens to move by driving the first driving motor; the second driving chip is connected with the photosensitive element through the second driving motor, and the second driving chip is configured to drive the photosensitive element to move by controlling the second driving motor.

12. The optical image stabilization system as claimed in claim 11, wherein the detection module is connected with the first driving chip, the detection module is further configured to transmit the acquired shake data to the first driving chip;
the first driving chip is configured to analyze the shake data, and obtain, through the analysis, at least one of a translation amount for the lens, a translation amount for the photosensitive element, and a rotation amount for the photosensitive element;
the first driving chip is further configured to control, based on the obtained translation amount for the lens, the first driving motor to drive the lens to move;
the first driving chip is further configured to transmit at least one of the translation amount for the photosensitive element, the analyzed rotation amount for the photosensitive element to the second driving chip; and
the second driving chip is configured to control, based on the at least one of the obtained translation amount for the photosensitive element and the rotation amount for the photosensitive element, the second driving motor to drive the photosensitive element to move.

13. The optical image stabilization system as claimed in claim 11, wherein the detection module is connected with the second driving chip, and the detection module is further configured to transmit the acquired shake data to the second driving chip; the second driving chip is further configured to analyze the shake data, and obtain, through the analysis, at least one of a translation amount for the lens, a translation amount for the photosensitive element and a rotation amount for the photosensitive element;
the second driving chip is further configured to control, based on the at least one of the obtained translation amount for the photosensitive element and the rotation amount for the photosensitive element, the second driving motor to drive the photosensitive element to move; and
the second driving chip is further configured to transmit the analyzed translation amount for the lens to the first driving chip, and the first driving chip is configured to control, based on the translation amount for the lens, the first driving motor to drive the lens to move.

14. The optical image stabilization system as claimed in claim 10, wherein the detection module is connected with the processor, and the processor is connected with each of the first driving chip and the second driving chip; the processor is configured to process the shake data detected by the detection module, and obtain, through the processing, compensation data for the lens and compensation data for the photosensitive element;
the processor is further configured to transmit the compensation data for the lens to the first driving chip, and the first driving chip is configured to control, based on the compensation data for the lens, the lens to move; and the processor is further configured to transmit the compensation data for the photosensitive element to the second driving chip, and the second driving chip is configured to control, based on the compensation data for the photosensitive element, the photosensitive element to move.

15. An electronic device, comprising a lens, a photosensitive element, a first bracket, a first driving motor, and a second driving motor, wherein the first bracket has a first side and a second side arranged opposite to the first side, the first driving motor is arranged on the first side, the second driving motor is arranged on the second side, the lens is arranged on the first driving motor, and the first driving motor is configured to drive the lens to move; the photosensitive element is arranged on the second driving motor, and the second driving motor is configured to drive the photosensitive element to move;
wherein the electronic device further comprises a detection module, a first driving chip and a second driving chip, the first driving chip is connected with the lens through the first driving motor, and the second driving chip is connected with the photosensitive element through the second driving motor;
the detection module is configured to acquire shake data of the lens;
when the shake data is less than or equal to a first threshold, based on the shake data and a first compensation strategy, at least one of the lens and the photosensitive element is driven to move;
when the shake data is greater than the first threshold and is less than or equal to a second threshold, based on the shake data and a first sub-strategy of a second compensation strategy, the lens and the photosensitive element are driven to move; and
when the shake data is greater than the second threshold, based on the shake data and a second sub-strategy of the second compensation strategy, the lens and the photosensitive element are driven to move;
wherein the first driving chip is configured to drive, by controlling the first driving motor, the lens to translate in a preset plane, and the second driving chip is configured to drive, by controlling the second driving motor, the photosensitive element to translate in the preset plane or to rotate around a preset axis.

16. The electronic device as claimed in claim 15, wherein when the shake data is less than or equal to the first threshold, at least one of the first driving chip, the second driving chip, and a processor is configured to acquire, based on the shake data, at least one of a translation amount for the lens and a rotation amount for the photosensitive element;
when only a first translation amount for the lens is acquired based on the shake data, the first driving chip is configured to control the first driving motor to drive the lens to translate, based on the first translation amount for the lens; and
when a second translation amount for the lens and a first rotation amount for the photosensitive element are acquired based on the shake data, the first driving chip is configured to control the first driving motor to drive the lens to translate, based on the first translation amount for the lens, and the second driving chip is configured to control the second driving motor to drive the photosensitive element to rotate, based on the first rotation amount for the photosensitive element.

17. The electronic device as claimed in claim 15, wherein when the shake data is larger than the first threshold and is less than or equal to the second threshold:

at least one of the first driving chip, the second driving chip, and the processor is configured to acquire, based on the shake data, a third translation amount for the lens and a fourth translation amount for the photosensitive element, the first driving chip is configured to control the first driving motor to drive the lens to translate, based on the third translation amount for the lens, and the second driving chip is configured to control the second driving motor to drive the photosensitive element to translate, based on the fourth translation amount for the photosensitive element; or at least one of the first driving chip, the second driving chip, and the processor is configured to acquire, based on the shake data, a fifth translation amount for the lens, a sixth translation amount for photosensitive element, and a second rotation amount for the photosensitive element, the first driving chip is configured to control the first driving motor to drive the lens to translate, based on the fifth translation amount for the lens, the second driving chip is configured to control the second driving motor to drive the photosensitive element to translate, based on the sixth translation amount for photosensitive element, and the second driving chip is further configured to control the second driving motor to drive the photosensitive element to rotate, based on the second rotation amount for the photosensitive element.

* * * * *